US012153900B2

(12) United States Patent
Katzenberger et al.

(10) Patent No.: US 12,153,900 B2
(45) Date of Patent: Nov. 26, 2024

(54) SPARSE DATA HANDLING AND BUFFER SHARING TO REDUCE MEMORY ALLOCATION AND RECLAMATION

(71) Applicant: Microsoft Technology Licensing, LLC, Redmond, WA (US)

(72) Inventors: Gary Shon Katzenberger, Fall City, WA (US); Petro Luferenko, Redmond, WA (US); Costin I. Eseanu, Redmond, WA (US); Eric Anthony Erhardt, Bismark, ND (US); Ivan Matantsev, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 496 days.

(21) Appl. No.: 16/670,779

(22) Filed: Oct. 31, 2019

(65) Prior Publication Data
US 2020/0348990 A1    Nov. 5, 2020

Related U.S. Application Data

(60) Provisional application No. 62/843,245, filed on May 3, 2019.

(51) Int. Cl.
*G06N 20/00* (2019.01)
*G06F 8/30* (2018.01)
(Continued)

(52) U.S. Cl.
CPC ............ *G06F 8/31* (2013.01); *G06F 9/30036* (2013.01); *G06F 9/30079* (2013.01);
(Continued)

(58) Field of Classification Search
CPC ............ G06F 9/30036; G06F 9/30079; G06F 9/5016; G06F 9/5022; G06F 9/544; G06F 12/0207; G06N 20/00
See application file for complete search history.

(56) References Cited

U.S. PATENT DOCUMENTS

| 5,432,909 | A | * | 7/1995 | Cok | ................. | G06F 15/17337 |
| | | | | | | 709/251 |
| 5,828,784 | A | * | 10/1998 | Miyashita | ................. | G06T 9/40 |
| | | | | | | 375/E7.266 |

(Continued)

OTHER PUBLICATIONS

"Bureau of Transportation Statistics Flight Delay Dataset 2018", Retrieved from: https://www.transtats.bts.gov/Fields.asp?Table_ID=236, Jun. 20, 2019, 3 Pages.

(Continued)

*Primary Examiner* — Emerson C Puente
*Assistant Examiner* — Jonathan R Labud
(74) *Attorney, Agent, or Firm* — Weaver IP L.L.C.

(57) ABSTRACT

Sparse data handling and/or buffer sharing are implemented. Data may be buffered in reusable buffer arrays. Data may comprise fixed or variable length vectors, which may be represented as sparse or dense vectors in a values array and indices array. Data may be materialized from a dataview comprising a non-materialized view of data in a machine-learning pipeline by cursoring over rows of the dataview and calling delegate functions to compute data for rows in an active column. A buffer and/or its set of arrays storing a first vector may be reused for a second and additional vectors, for example, when the length of buffer arrays is equal to or greater than the length of the second and additional vectors, which may be selectively stored as sparse or dense vectors to fit the array set. Shared buffers may be passed as references between delegate functions for reuse.

20 Claims, 6 Drawing Sheets

(51) Int. Cl.
G06F 9/30 (2018.01)
G06F 9/50 (2006.01)
G06F 9/54 (2006.01)
G06F 16/2453 (2019.01)
G06F 16/2455 (2019.01)

(52) U.S. Cl.
CPC .......... *G06F 9/5016* (2013.01); *G06F 9/5022* (2013.01); *G06F 9/544* (2013.01); *G06F 16/24535* (2019.01); *G06F 16/24568* (2019.01); *G06N 20/00* (2019.01)

(56) References Cited

U.S. PATENT DOCUMENTS

| | | | | |
|---|---|---|---|---|
| 5,905,997 | A * | 5/1999 | Stiles | G06F 12/0864 711/128 |
| 9,274,861 | B1 * | 3/2016 | Karppanen | G06F 9/546 |
| 10,474,652 | B2 * | 11/2019 | Baskett | G06F 16/22 |
| 2008/0005499 | A1 * | 1/2008 | McDonnell | G06F 9/544 711/154 |
| 2010/0299367 | A1 * | 11/2010 | Chakrabarti | G06F 16/24578 707/769 |
| 2014/0223561 | A1 * | 8/2014 | Mitola, III | G06F 11/0721 726/23 |
| 2015/0278759 | A1 * | 10/2015 | Harris | G06Q 10/08355 705/338 |
| 2019/0065053 | A1 * | 2/2019 | Eads | G06F 3/067 |
| 2019/0129764 | A1 | 5/2019 | Johnson et al. | |
| 2019/0278640 | A1 | 9/2019 | Khare et al. | |
| 2020/0081916 | A1 | 3/2020 | Mcshane et al. | |
| 2020/0167424 | A1 * | 5/2020 | Certain | G06F 16/2228 |
| 2020/0250897 | A1 | 8/2020 | Wei et al. | |
| 2020/0272934 | A1 | 8/2020 | Manamohan et al. | |
| 2020/0293491 | A1 | 9/2020 | Zhang | |
| 2020/0348912 | A1 | 11/2020 | Katzenberger et al. | |
| 2020/0349469 | A1 | 11/2020 | Katzenberger et al. | |

OTHER PUBLICATIONS

"Caffe 2. 2018", Retrieved from: https://caffe2.ai/, Jun. 20, 2019, 2 Pages.
"Criteo 2014 Kaggle Challenge", Retrieved from: http://labs.criteo.com/2014/02/kaggle-display-advertising-challenge-dataset/, Feb. 10, 2014, 5 Pages.
"H2O", Retrieved from: https://github.com/h2oai/h2o-3, Jun. 20, 2019, 20 Pages.
"Jupyter", Retrieved from: https://jupyter.org/, Jun. 20, 2019, 7 Pages.
"LightGBM: A Highly Efficient Gradient Boosting Decision Tree", In Proceedings of 31st Conference on Neural Information Processing, Dec. 4, 2017, 2 Pages.
"Matplotlib", Retrieved from: https://matplotlib.org/, Jun. 20, 2019, 3 Pages.
"ml.net", Retrieved from: https://github.com/dotnet/machinelearning, Jun. 20, 2019, 4 Pages.
"Nimbus ML", Retrieved from: https://github.com/Microsoft/NimbusML, Jun. 20, 2019, 3 Pages.
"PyTorch", Retrieved from: http://pytorch.org/, Mar. 15, 2017, 4 Pages.
"The State of Data Science and Machine Learning", Retrieved from: https://www.kaggle.com/surveys/2017/, Jun. 20, 2019, 11 Pages.
"TransmogrifAI", Retrieved from: https://transmogrif.ai/, Jun. 20, 2019, 4 Pages.
"Zeppelin", Retrieved from: https://zeppelin.apache.org/, Jun. 20, 2019, 9 Pages.
Abadi, et al., "TensorFlow: A System for Large-scale Machine Learning", In Proceedings of the 12th USENIX Conference on Operating Systems Design and Implementation, vol. 16, Nov. 2, 2016, pp. 265-283.
Abrahams, et al., "Boost.Python", Retrieved from: https://www.boost.org/doc/libs/1_70_0/libs/python/doc/html/index.html, Jun. 20, 2019, 1 Page.
Agarwal, et al., "CNTK: Microsoft's Open-Source Deep-Learning Toolkit", In Proceedings of the 22nd International Conference on Knowledge Discovery and Data Mining, Aug. 13, 2016, pp. 2135.
Amizadeh, et al., "Making Classical Machine Learning Pipelines Differentiable: A Neural Translation Approach", Retrieved from https://arxiv.org/pdf/1906.03822.pdf, Jun. 10, 2019, 9 Pages.
Andrew, et al., "Scalable Training of L1-Regularized Log-Linear Models", Retrieved from: https://www.microsoft.com/en-us/research/wp-content/uploads/2007/01/andrew07scalable.pdf, Jan. 1, 2007, 8 Pages.
Chen, et al., "MXNet: A Flexible and Efficient Machine Learning Library for Heterogeneous Distributed Systems", In Journal of the Computing Research Repository, Dec. 2015, 6 Pages.
Colbert, et al., "The NumPy Array: A Structure for Efficient Numerical Computation", In Journal of Computing in Science & Engineering vol. 13, Issue 2, Mar. 14, 2011, 8 Pages.
Crankshaw, "Clipper: A Low-Latency Online Prediction Serving System", In Proceedings of 14th USENIX Symposium on Networked Systems Design and Implementation, Mar. 27, 2017, pp. 613-627.
Eerhardt, et al., "I Data View Implementation", Retrieved from: https://github.com/dotnet/machinelearning/blob/master/docs/code/IDataViewImplementation.md, Jun. 20, 2019, 16 Pages.
Finley, Tom, "Dotnet Machinelearning", Retrieved from: https://github.com/dotnet/machinelearning/blob/master/docs/code/IDataViewDesignPrinciples.md, Jun. 20, 2019, 14 Pages.
Friedman, "Greedy Function Approximation: A Gradient Boosting Machine", In Journal of Annals of statistics, vol. 29, Issue 5, Oct. 2001, pp. 1189-1232.
Graefe, Goetz., "Volcano: An Extensible and Parallel Query Evaluation System", In IEEE Transactions on Knowledge and Data Engineering vol. 6, Issue 1, Feb. 1994, pp. 120-135.
McAuley, et al., "Ups and Downs: Modeling the Visual Evolution of Fashion Trends with One-Class Collaborative Filtering", In Proceedings of the 25th International World Wide Web Conferences Steering Committee, 2016, Apr. 11, 2016, pp. 507-517.
McKinney, Wes., "Pandas: a Foundational Python Library for Data Analysis and Statistics", In Journal for Python for High Performance and Scientific Computing vol. 14, 2011, 9 Pages.
Meng, et al., "MLlib: Machine Learning in Apache Spark", In Journal of Machine Learning Research vol. 17, Issue 1, Jun. 2016, 7 Pages.
Michelangelo, "Michelangelo", https://eng.uber.com/michelangelo/, Sep. 5, 2017, 22 Pages.
Mikolov, et al., "Distributed Representations of Words and Phrases and their Compositionality", In Proceedings of the 27th Annual Conference on Neural Information Processing Systems, Dec. 5, 2013, pp. 3111-3119.
Olston, et al., "TensorFlow-Serving: Flexible, High-Performance ML Serving", Retrieved from: https://arxiv.org/pdf/1712.06139.pdf, Dec. 27, 2017, 8 Pages.
Pedregosa, et al., "Scikit-learn Machine Learning in Python", In Journal of Machine Learning Research vol. 12, Oct. 2011, pp. 2825-2830.
Shmoradims, et al., "I Data ViewType System", Retrieved from: https://github.com/dotnet/machinelearning/blob/master/docs/code/IDataViewTypeSystem.md, Jun. 20, 2019, 20 Pages.
Shwartz, et al., "Pegasos: Primal Estimated Sub-Gradient Solver for SVM", In Journal of Mathematical Programming vol. 127, Issue 1, Jun. 20, 2019, 27 Pages.
Stonebraker, et al., "C-store: A Column-oriented DBMS", In Proceedings of the 31st International Conference on Very Large Data Bases, Aug. 30, 2005, pp. 553-564.
Tran, et al., "Scaling up Stochastic Dual Coordinate Ascent", In Proceedings of the 21th ACM SIGKDD International Conference on Knowledge Discovery and Data Mining, Aug. 10, 2015, pp. 1185-1194.
Varoquaux, Gael., "Joblib Documentation", Retrieved from: https://buildmedia.readthedocs.org/media/pdf/joblib/latest/joblib.pdf, Jun. 19, 2019, 83 Pages.

(56) References Cited

OTHER PUBLICATIONS

Zaharia, et al., "Resilient Distributed Datasets: A Fault-Tolerant Abstraction for In-Memory Cluster Computing", In Proceedings of the 9th USENIX conference on Networked Systems Design and Implementation, Apr. 25, 2012, 14 Pages.
Zinkevich, Martin., "Rules of Machine Learning: Best Practices for ML Engineering", Retrieved from: http://martin.zinkevich.org/rules_of_ml/rules_of_ml.pdf, Jun. 20, 2019, 24 Pages.
Zeeshan, et al., "Machine Learning at Microsoft with ml.net", In Journal of Computer Science, May 14, 2019, 11 Pages.
"Notice of Allowance Issued in U.S. Appl. No. 16/598,663", Mailed Date: Dec. 14, 2020, 11 Pages.
"Non Final Office Action Issued in U.S. Appl. No. 16/661,131", Mailed Date: Mar. 31, 2022, 9 Pages.
"Notice of Allowance Issued in U.S. Appl. No. 16/661,131", Mailed Date: Nov. 16, 2022, 8 Pages.
"Notice of Allowance Issued in U.S. Appl. No. 16/661,131", Mailed Date: Aug. 24, 2022, 8 Pages.

\* cited by examiner

| | | DVp | | |
|---|---|---|---|---|
| C1 | C2 | C3-Cn | Feature | Label |
| D1 | D2 | D3-Dn | Df | Dp |

FIG. 3

| C1 | C2 | C3-Cn | Feature | Label |
|---|---|---|---|---|
| xyz | 0 | ... | 0, 1, 0, 0, 2 | 0 |
| abc | 1 | ... | 0, 7, 0, 0 | 1 |
| foo | 2 | ... | 7, 2, 4, 0, 3, 8, 2, 5 | 1 |
| klm | 3 | ... | 0, 6, 3, 0, 1, 0, 8 | 0 |
| pqr | 4 | ... | 2, 1, 5, 0, 0 | 1 |
| ... | ... | ... | ... | ... |

FIG. 4

SPARSE DATA HANDLING AND BUFFER SHARING TO REDUCE MEMORY ALLOCATION AND RECLAMATION

CROSS-REFERENCE TO RELATED APPLICATION

This application claims priority to U.S. Provisional Application No. 62/843,245, filed on May 3, 2019, and entitled "Efficient Streaming Based Lazily-Evaluated Machine Learning Framework," the entirety of which is incorporated by reference herein.

BACKGROUND

Machine learning (ML) may be used to train a model (e.g., with training data) to make data-based decisions (e.g., predictions), such as assigning labels to input data based on patterns learned from training data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for sparse data handling and buffer sharing to reduce memory allocation and reclamation. Data may be buffered in reusable buffer arrays. Data may comprise fixed or variable length vectors, which may be represented as sparse or dense vectors in a values array and indices array. Data may be materialized, for example, from a dataview comprising a non-materialized view of data in a machine-learning (ML) pipeline by cursoring over rows of the dataview and calling delegate functions to compute data for rows in an active column. A buffer and/or its set of arrays storing a first vector may be reused for a second and additional vectors, for example, when the length of buffer arrays is equal to or greater than the length of the second and additional vectors, which may be selectively stored as a sparse or dense vectors to fit in the set of arrays. Shared buffers may be passed as references between delegate functions for reuse.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a table providing an example of a dataview representing a chain of delegates, according to an example embodiment.

FIG. 4 shows a table providing an example of materialized values based on cursoring and execution of a chain of delegate functions, according to an example embodiment.

Figure 1:
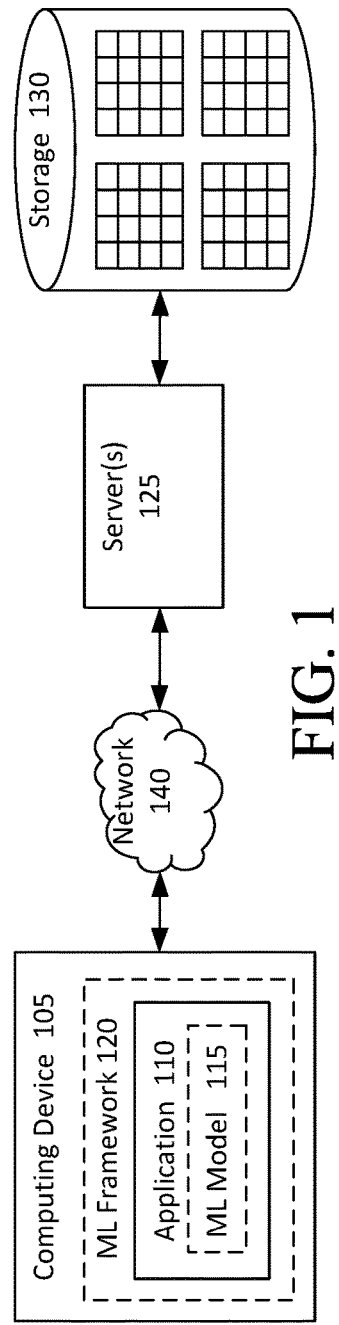
FIG. 1 shows a block diagram of a system for an efficient, streaming-based, lazily-evaluated ML framework, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

A trainable model may be referred to as a machine learning (ML) model. An ML model may be used to train a model (e.g., with training data) to make data-based decisions (e.g., predictions), such as assigning labels to input data based on patterns learned from training data. An application may use a model to make data-based decisions that would be extremely difficult for an application developer to author, e.g., due to complex statistical nature.

Applications and models represent distinct fields of software engineering and data science that are developed, deployed and managed separately by different processes and/or entities. Previous attempts to provide ML model support to applications may lack in one or more areas. Scikit-learn (SKL) is an example. SKL is an ML library for the Python programming language. SKL provides classification, regression and clustering algorithms designed to operate with Python numerical and scientific libraries NumPy and SciPy. Python-based libraries inherit many syntactic idiosyncrasies and language constraints (e.g., interpreted execution, dynamic typing, global interpreter locks that restrict parallelization), making them suboptimal for high-performance applications targeting a myriad of devices. Additionally, SKL cannot train a model with a voluminous dataset larger than computer primary memory. Also, SKL consumes significant memory resources as a function of materializing an input data set and performing all transformations. Further, SKL consumes significant processing resources by performing one step at a time before subsequent steps can begin and by performing all steps on all data before any output is available.

Methods, systems and computer program products are provided for an efficient, streaming-based, lazily-evaluated machine learning (ML) framework. An ML pipeline of operators produce and consume a chain of dataviews representing a computation over data. Non-materialized (e.g., virtual) views of data in dataviews permit efficient, lazy evaluation of data on demand regardless of size (e.g., in excess of main memory). Data may be materialized by DataView cursors (e.g., movable windows over rows of an input dataset or DataView). Computation and data movement may be limited to rows for active columns without processing or materializing unnecessary data. A chain of dataviews may comprise a chain of delegates that reference a chain of functions. Assembled pipelines of schematized compositions of operators may be validated and optimized with efficient execution plans. A compiled chain of functions may be optimized and executed in a single call. Dataview based ML pipelines may be developed, trained, evaluated and integrated into applications.

Such embodiments may be implemented in various environments. For instance, FIG. 1 shows a block diagram of a system 100 for an efficient, streaming-based, lazily-evaluated ML framework, according to an example embodiment. Example system 100 may comprise, for example, a computing device 105, one or more servers 125, and storage 130, which are communicatively coupled by a network 140. FIG. 1 presents one of many computing environments that may implement subject matter described herein.

Computing device 105 may comprise any computing device. Computing device 105 may be, for example, any type of stationary or mobile computing device, such as a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 105 may comprise one or more applications, operating systems, virtual machines, storage devices, etc. that may be executed, hosted, and/or stored therein or via one or more other (e.g., networked) computing devices. In an example, computing device 105 may access one or more server computing devices (e.g., over a network). An example computing device with example features is presented in FIG. 8, which is described in detail further below.

Server(s) 125 may comprise one or more servers, such as one or more application servers, database servers, authentication servers, etc. Server(s) 125 may support operations interactions with computing device 105 and storage 130. Server(s) 125 may serve data and/or programs to computing device 105. Programs may include, for example, an application developer framework (e.g., .NET framework), a model development framework (e.g., ML.NET framework), applications (e.g., .NET applications), etc. Server(s) 125 may provide application programming interfaces (APIs) for application 110 to interact with storage 130. Server(s) 125 may comprise, for example, a database engine or management system (DBMS), such as when storage 130 comprises a database. An example of a database server is Microsoft Azure SQL Server. Server(s) 125 may manage storing, processing, and securing and retrieving data in storage 130. Application 110 may use storage 130, for example, to store and/or retrieve data, such as ML training data, test data and/or prediction data.

Storage 130 may comprise one or more storage devices. Storage 130 may store data and/or programs (e.g., information). Data may be stored in storage 130 in any format, including arrays, tables, etc. In a table data embodiment, storage 130 may contain many tables (e.g., hundreds, thousands, millions, tens of millions) with many rows and/or columns (e.g., hundreds, thousands, millions, tens of millions). Specific columns and rows may or may not have data entries. Sparsely populated data (e.g., columns) may be referred to as sparse data. Sparse data may mean that very few values or entries have a value other than a "default" value, such as zero and/or may mean that there are many missing entries.

Network 140 may include one or more of any of a local area network (LAN), a wide area network (WAN), a personal area network (PAN), a combination of communication networks, such as the Internet, and/or a virtual network. In example implementations, computing device 105 and server(s) 125 may be communicatively coupled via network 105. Server(s) 125 and computing device 105 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 105 may comprise application 110. Application 110 may comprise any type of application. Application 110 may comprise one or more executable programs, dynamic link libraries (DLLs), etc. Application 110 may be developed in an application development framework. In an example, computing device 105 may access application 110 and/or a web-based application development framework via server(s) 125. In an example, application 110 may comprise a .NET (dot-net) application created in a .NET framework. Dot-net is a cross-platform, open source developer platform for building many different types of applications with many different languages, editors and libraries available to build applications for many different environments (e.g., web, mobile, desktop, gaming, and Internet of Things (IoT) environments). Developer languages may include, for example, C#, F# and Visual Basic. Dot-net may provide a managed runtime environment with a just-in-time (JIT) compiler for execution of applications.

Application 110 may interact with a model, integrate a model, support model development, etc. A dashed box in FIG. 1 indicates many possible associations between application 110 and ML model 115. ML model 115 may comprise any type of model composition in any state (e.g., source code in compiled or pre-compiled state, machine code). ML model 115 may be accessed (e.g., called) by and/or integrated in (e.g., to varying degrees) application 110. ML model 115 may be developed, trained and/or tested before, during and/or after development of application 110. In an example, ML model 115 may be created separately, in conjunction with and/or within application 110.

ML model 115 may be developed, for example, in an ML framework (e.g., ML framework 120). In an example, computing device 105 may access a web-based ML framework provided by server(s) 125. ML framework 120 may incorporate trained model functionality (e.g., speech recognition, image classification) in applications. An example of ML framework 120 is ML.NET. In an example, programs written for .NET Framework may incorporate ML models with ML.NET. ML framework 120 (e.g., ML.NET) may be implemented as a (e.g., .NET) machine learning library that allows developers to build (e.g., complex) machine learning pipelines, evaluate them, and utilize them (e.g., directly) for prediction. Model compositions may comprise one or more pipelines. A pipeline may comprise multiple operators, such as data featurization operators and models. In an example, a chain of transformer operators may implement multiple transformation steps that featurize and transform raw input data into one or more features for evaluation by one or more models. Data featurization operators may be followed by one or more models (e.g., ML models). Models may be stacked or form ensembles. Programs written for ML framework 120 may comprise "managed code" (e.g., in contrast to native code), for example, when they execute in a software (e.g., runtime) environment (e.g., in contrast to a hardware environment). In an example, a .NET runtime (e.g., Common Language Runtime (CLR)) is an application virtual machine that executes managed code while providing services, such as memory management, thread management, security, type safety, exception handling and garbage collection (e.g., for unused memory allocations).

ML framework 120 may be unified, extensible, scalable and efficient. A unified framework may host a variety of models and components. Trained ML pipelines (e.g., ML model 115) may be deployable into production environments. ML pipelines may be scalable to operate with any processor and memory configuration regardless of training or prediction data dimensions. Integration of applications and an ML model toolkit (e.g., ML.NET) may, for example, (i) limit library dependencies; (ii) handle voluminous (e.g., training) datasets too large to fit in computer primary memory (e.g., RAM); (iii) scale to many or few cores and nodes; (iv) be portable across multiple (e.g., many) target platforms; (v) be model class agnostic (e.g., since different ML problems may have different model classes); and, (vi) capture a full prediction pipeline. A full pipeline may, for example, take a test example from a given domain (e.g., an email with headers and body) and produce a prediction that may be structured and domain-specific (e.g., a collection of likely short responses). Encapsulating predictive pipelines may (e.g., effectively) decouple application logic from model development. Utilizing a (e.g., complete) train-time pipeline in production may support building efficient, reproducible, production-ready models (e.g., ML model 115).

ML framework 120 may provide a DataView system. A dataview system may comprise interfaces and components that provide efficient, compositional processing of schematized data for ML and advanced analytics applications. A dataview system may efficiently handle high dimensional data and large data sets (e.g., larger than main memory). A DataView system may provide efficient executions, for example, through streaming data access, immutability and lazy evaluation. DataView system components or operators may include, for example, data loaders, transformers, estimators, algorithms, trainers, etc.

Figure 2:
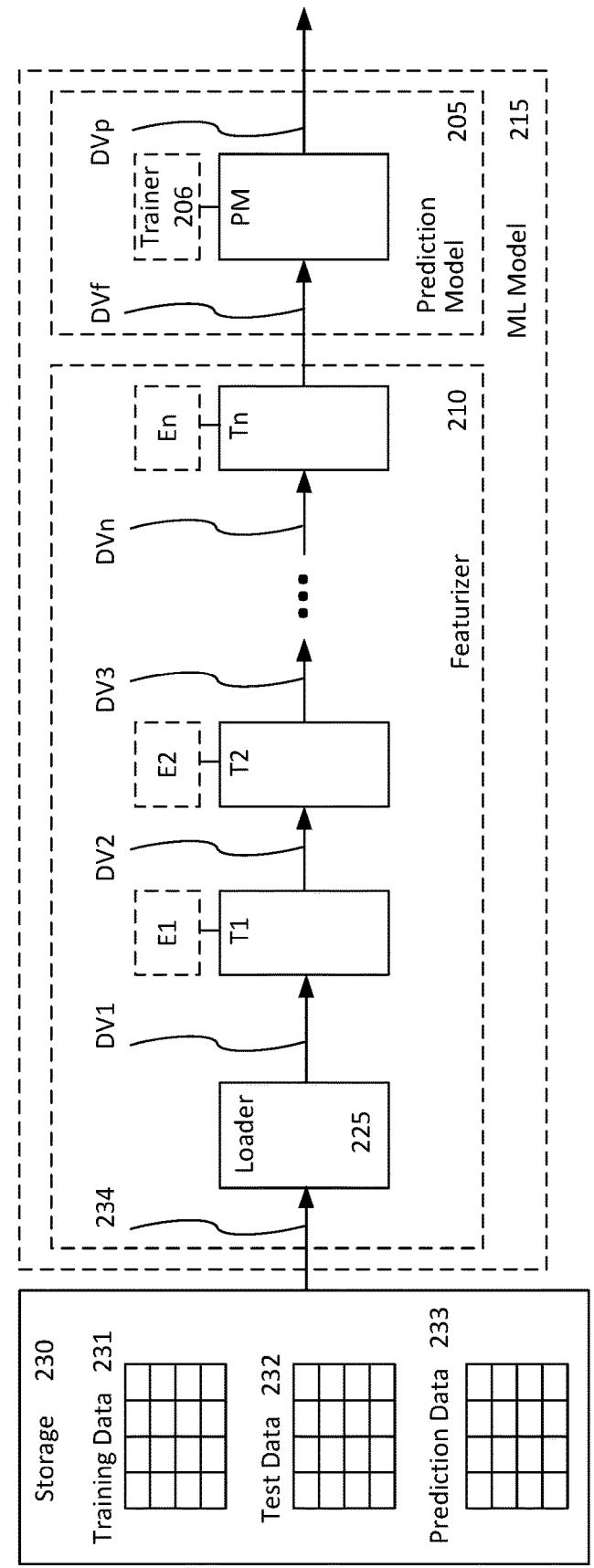
FIG. 2 shows a block diagram of a composition of an ML model, according to an example embodiment.

FIG. 2 shows a block diagram of a system 200 for implementing an ML model 215, according to an example embodiment. In particular, FIG. 2 provides a visual depiction of an example of a code implementation of ML model 215. ML model 215 includes a prediction model 205 and a featurizer 210. Prediction model 205 includes a trainer 206 and a prediction model (PM). Featurizer 210 includes a loader 225 and first-nth transformers T1-Tn. Example system 200 is presented as a simple example. Other examples or implementations may be significantly more complex. Example system 200 may comprise ML model 215 and storage 230.

Storage 230 may comprise one or more local and/or remote storage devices. In an example, storage 230 may comprise, for example, storage for a computing device (e.g., computing device 105) or a remote database accessible through a database server (e.g., server(s) 125). Storage 230 may store, for example, one or more of training data 231, test data 232 and prediction data 233, which may be provided (e.g., streamed) as input data 234 to ML model 215.

ML model 215 may comprise a trainable model with one or more trainable components, elements or operators. ML model 215 may have a variety of states, such as untrained, trained, tested, untested, source (code), compiled (code), uncompiled (code) and so on. ML model refers to an ML model in any state.

ML model 215 may implement a dataview system (e.g., provided by an ML framework). A dataview comprises a representation of or a reference to a computation over data, which is a non-materialized view of the data. A DataView is the result of computations over input/source data (e.g., one or more base tables such as training data 231) and/or dataviews. A DataView may represent a computation up to its location in an ML pipeline. DataView components may be combined for compositional pipelines. ML model 215, comprising a chain of operators, may be compilable into a chain of dataviews. A dataview may be lazily evaluated, for example, to conserve resources and to provide partial results faster. A dataview may be lazily evaluated unless, for example, forced to be materialized (e.g., for multiple passes over data). DataView may provide streaming access to data, for example, so that working sets may exceed the size of main memory.

A dataview may represent the input and/or output of operators (e.g., pipeline elements such as transformers). A dataview may comprise a collection of rows and columns. A view may have any number of columns A dataview may comprise schema information. A DataView schema may specify (e.g., for each column), for example, a column name, index, data type and annotation. A schema may be presented as a schema object. Schemas may be used to define expected input and output (e.g., read and write) dataviews for pipelined dataview system components. A (e.g., each) column may have an associated name, index, data type and (e.g., optionally) an annotation. Types may include, for example, text, Boolean, single and double precision floating point, signed and unsigned integer values, values for ids and unique hashes, date time, time span, key types (e.g., for hash values), vector types, etc. Column type system may be open and may support vector types. In an example, a set of related primitive values may be grouped in a single vector-valued column. In an example, a vector type vector<T, N> type indicates a column's values are vectors of items of type T, with size N, which may be used to represent multi-dimensional data associated rows, such as pixels in an image or tokens in text. Features may be gathered into one or more vector-valued columns. Values may be stored in blocks. A block may hold values for a single column across multiple rows. DataView schemas may be ordered. Multiple columns may share the same name, in which case, one column may hide other columns. Referencing a column by name may (e.g., always) map to the latest column with that name.

A dataview may be distinguished from a table. Tables and views may be schematized and organized into typed columns and rows conforming to the column types. However, a table may comprise a body of data while a view of the data (or of another view) may comprise a result of a query on one or more tables or views. As another example, views may be immutable. In contrast, tables may be mutable. As another example, views may be composable. New views may be formed, for example, by applying transformations (e.g., queries) on other views. In contrast, forming a new table from an existing table may involve copying data, without any link between the new table and the original table. As another example, views may be virtual (e.g., they can be lazily computed on demand from other views or tables without materializing any partial results). In contrast, tables may be realized/persisted. A table contains values in rows while a view may present values computed based on the table or other views, without containing or owning the values. Immutability and compositionality may support reasoning over transformation, such as query optimization and remoting Immutability may support concurrency and thread safety. Views being virtual may minimize I/O, memory allocation and computation. Information may be accessed, memory may be allocated and computation may be performed, for example, (e.g., only) when needed to satisfy a request for information.

A dataview may support high dimensional data and vector types. In an example, machine learning and advanced analytics applications may involve high-dimensional data. For example, learning from text may utilize, for example, bag-of-words (e.g., FeaturizeText), one-hot encoding or hashing variations to represent non-numerical data. These techniques may generate an enormous number of features. Representing each feature as an individual column may not be ideal. A dataview may represent a (e.g., each) set of features as a single vector column. A vector type may specify an item type and optional dimensionality information. An item type must be a primitive, non-vector, type. Optional dimensionality information may specify the number of items in corresponding vector values. When the size is unspecified, A vector type may be variable length, for example, when a size is not specified. In an example, a TextTokenizer transform (e.g., contained in FeaturizeText) may map a text value to a sequence of individual terms. This transformation may produce variable-length vectors of text. Fixed-size vector columns may be used, for example, to represent a range of a column from an input dataset.

Computations may be composed using dataviews. Operators in an ML framework may be composed using a DataView abstraction to produce efficient machine learning pipelines. A Transformer may be applied to a DataView to produce a derived DataView (e.g., to prepare data for training, testing, or prediction serving). A learner is a machine learning algorithm trained on training data (e.g., provided by a transform) to produce a predictive model (PM). An evaluator may be used for testing a trained model, for example by taking scored test datasets to produce metrics, such as precision, recall, F1, AUC, etc. A loader may be used to represent data sources as a DataView. A saver may serialize DataViews to a form that can be read by a loader.

Transforms may take a DataView as input and produce a DataView as output. A transforms may "add" one or more computed columns to its input schema. An output schema may include all the columns of the input schema, plus some additional columns, whose values may be computed starting from one or more input columns. An added column may have the same name as an input column, in which case, the added column may hide the input column. Multiple primitive transforms may be applied to achieve higher-level semantics. In an example, a FeaturizeText transform may comprise a composition of nine primitive transforms.

Transforms may be fixed or trainable. A fixed transform may, for example, map input data values to output by applying pre-defined computation logic (e.g., Concat). A trainable transform may, for example, have behavior determined (e.g., automatically) from training data. For example, normalizers and dictionary-based mappers translating input values into numerical values (e.g., used in FeaturizeText) may build their state from training data. In an example, given a pipeline, a call to Train may trigger execution of (e.g., all) trainable transforms (e.g., and learners) in topological order. A trained transform (e.g., a learner) may produce a DataView representing computation up to that point in the pipeline. A DataView may be used by downstream operators. In an example, a saved state of a trained transform may be serialized, such that the transform may not be retrained, e.g., when loaded back.

Learners may be similar to trainable transforms. Learners are machine learning algorithms that take DataView as input and produce predictive models, which may comprise transforms that can be applied over input DataViews and produce predictions. Learners may be used, for example, for binary classification, regression, multi-class classification, ranking, clustering, anomaly detection, recommendation and sequence prediction tasks.

A dataview representation of or reference to a computation over data may comprise delegates that represent (e.g., point to) delegate functions to compute data values. A delegate may interpret or operate on (e.g., perform computations on) data. Entries in a dataview may comprise delegates (e.g., as opposed to realized values in a table). A delegate may comprise or reference code that performs a task. A delegate may be a type of data structure that represents references to methods with a particular parameter list and return type. A delegate may be similar to a function pointer. A delegate may be used to pass a method as an argument or parameter to another method.

A cursor may be used to access data referenced by a dataview (e.g., delegate entries in rows and columns). ML pipelines may be compiled into chains of DataViews, where data is accessed through cursoring. A dataview may be a source of cursors. A cursor is an object that iterates through data or dataviews (e.g., one row at a time) and presents available entries (e.g., in active columns). In an example, rows of a dataview may be accessed (e.g., sequentially) via a row cursor. A row cursor may be acquired (e.g., from or for a view), for example, by calling a GetRowCursor method. A row cursor may comprise a movable window on a (e.g., single) row of a view, known as a current row. A row cursor may provide column values (e.g., for active columns) in a current row. A (e.g., each) cursor may have one or more (e.g., a set of) active columns, which may be specified at cursor construction time. A row cursor may advance to another (e.g., the next) row, for example, by calling the MoveNext( ) method. Multiple cursors may be active (e.g., on the same or different threads) on the same view (e.g., sequentially and in parallel). Views may support multiple iterations through rows. Shuffling rows may be supported via an optional random number generator passed at cursor construction time.

Values represented in a dataview may not be fetched directly from rows using a cursor (e.g., a RowCursor). A delegate may be used to fetch objects (e.g., using a getgetter method on a row). In an example procedure, client code may ask a dataview for a cursor. The request may include specification of which columns should be active and whether shuffling should be performed. The dataview may create and return the requested cursor. Client code may request (e.g. from the cursor) a Getter delegate for each active column, which may be obtained, for example, by using a GetGetter method on the cursor. Delegates returned by a GetGetter method may be tied to the Cursor they are requested for. Delegates returned by calling the GetGetter method on a Cursor may be "chained," e.g., leveraging delegates provided by Cursors of DataViews higher up the chain. This may be transparent to client code. Client code may advance the cursor from one row to the next, for example, using a MoveNext method on the cursor. The value of an active column for a current row (i.e. the row a cursor is on) may be obtained by invoking the Getter delegate for the active column.

Parallel processing may improve performance. Parallel processing may be implemented, for example, in an algorithm and/or by parallel cursoring. In an example, a transform may acquire a cursor set from its input DataView. Cursors sets may be propagated upstream until a data source is found. A cursor set may, e.g., at this point, be mapped into available threads. Data may be collaboratively scanned. Cursor sets may return a consolidated, unique, cursor, e.g., from a callers' perspective. A cursor's data scan may be split into concurrent threads, e.g., from an execution perspective.

Parallel cursoring may enable (e.g., computation heavy) pipelines to leverage multiple cores without complicating each individual transform implementation. A set of cursors may be requested (e.g., using GetRowCursor method directed to an input view) for parallel execution, for example, when a transform may benefit from parallelism. Each of multiple cursors executed in parallel may serve up a subset of rows. Multiple cursors may be implemented in one or more components of a transformation chain. A component in the chain (e.g., a loader) may determine how many cursors should be active, create and return the cursors. Multiple cursors may be independently processed in different threads. Multiple cursors may be converted back into a single cursor. Splitting into multiple cursors may be done at a loader level or at an arbitrary point in a pipeline. A (e.g., pipeline) component that performs splitting may provide cursor consolidation logic. Intervening components may create a cursor on each input cursor, return that set of cursors and a consolidator.

Randomization may be provided. Some trainers (e.g., training algorithms) may request that the order of rows produced by a cursor be randomized or shuffled. A DataView may indicate (e.g., via a property) whether it supports shuffling. Shuffling may be implemented (e.g. by a dataview) with random numbers. In an example, a random number generator may be passed to a DataView's GetRowCursor method.

Intermediate data may be inspected, for example, during loading, processing, and model training. Intermediate data is the output of each stage in an ML pipeline. Intermediate data may be loaded into a DataView. In an example, an IDataView may be inspected by converting it to an Enumerable (e.g., using a CreateEnumerable method). In an (e.g., alternative) example (e.g., to iterate over rows of a DataView without conversion to an enumerable), a DataViewRowCursor may be created, for example, using a GetRowCursor method, passing a DataViewSchema of a DataView as a parameter. A MoveNext cursor may be used to iterate over rows along with ValueGetter delegates to extract respective values from a (e.g., each) column. Values in a column of a DataView may be accessed using a GetColumn method, which may return all values in a column as an Enumerable.

Dataviews may be (e.g., are) immutable and computations over data may be repeatable. Cursoring through data may not modify input/source data. Operations performed to materialize derived data for dataviews may be repeatable (e.g., values produced by two cursors constructed from the same view with the same arguments to GetRowCursor are identical). Performance may be enhanced (e.g., for multiple passes over a DataView pipeline), for example, by caching, which may be implemented transparent to a learning algorithm (e.g., due to immutability). Immutability supports parallel execution of a composed data pipeline graph and flexible scheduling without cloning source data.

Performance may be proportional to data movements and computations involved in scanning dataview rows. As iterators in database, cursors may be pull-based. In an example, e.g., after an initial setup phase that specifies active columns, cursors may not access data, for example, unless explicitly asked to. This may limit computations and data movements to those needed to materialize requested rows and column values within a row. This may (e.g., also) support efficient streaming of large data sets (e.g., directly from disk), without concern whether working sets fit into main memory.

A dataview system supports lazy evaluation or computation of training, evaluation or prediction data. Lazy evaluation or computation involves computing only what is needed when it is needed, which may conserve resources and generate results faster, for example, when only a subset of data may be processed to fulfill a request. Dataviews may be generated (e.g., and associated operations such as transformers may be executed), for example, (e.g., only) as and when needed. Calling a component may not result in computation. Consuming data (e.g., requesting or creating a cursor on a dataview) may, for example, invoke transformation logic to generate an output dataview. Instantiated component objects may represent promises of data. When declared, data operators may not immediately process data, but may validate that the operation is possible. Execution may be deferred until output data is requested. Computation for other columns and rows irrelevant to the request may be avoided, for example, when only a subset of columns or a subset of rows is requested. In an example implementation, there may be a default (e.g., which may be selectively overridden) to perform only computation needed for the requested columns and rows. Some transforms, loaders, and caching scenarios may be (e.g., fixed or selectively) speculative or eager in their computation. Previews may be provided for dataviews, transformers and estimators (e.g., output provided based on the first 100 rows of data).

Lazy computation may be provided in column and/or row directions. Computations may be limited to active (e.g., selected) columns and rows. A down-stream component in a data pipeline may request only a (e.g., small) subset of information produced by the pipeline. For example, code seeking to display the first 100 rows does not need to iterate through millions of rows. Similarly, code seeking to build a dictionary of terms used in one text column does not need to iterate over any other columns. Lazy upstream computations, performed as needed, may execute significantly faster and use significantly fewer resources than eager up-stream computation (i.e. always performing all computations).

In an example of lazy computation in the column direction, a row cursor may have a set of active columns, which may be determined by arguments passed to GetRowCursor. A cursor, and any upstream components, may (e.g., by default that may or may not be overridden) perform (e.g., only) computation or data movement necessary to provide values of active columns, but not inactive columns. For example, a ValueToKeyMapping Transformer may build a term dictionary from an input IDataView. The transformer may obtain a row cursor from the input view with only the term column active, avoiding data loading and computation that is not required to materialize the term column. In an example of lazy computation in the row direction, cursor computation and data movements may be limited to iterate over a small subset of (e.g., active) input rows needed to materialize the requested rows.

In an example, a (e.g., each) pipeline operator (e.g., transformer) may limit processing to rows and columns involved in providing requested output. For example, a first trainer may only need column X values to train and column X values may be determined by only a few columns produced by previous transform(s). A dataview system may traverse the DAG relationship chain to determine which transforms need to do computations and which columns need to be pulled in by loader to avoid unnecessary work. The determined transforms and columns may (e.g., then) be processed to provide output with minimal work.

CPU efficiency may be provided. Output of an initialization process at each DataView's cursor (e.g., where each cursor in an ML pipeline checks active columns and expected input types) may be a lambda function, which may be referred to as a getter. A getter may condense the logic of an operator into a single call. A (e.g., each) getter may, in turn, trigger the generation of a getter function of an upstream cursor until a data source is found (e.g., a cached DataView or input data). When all getters are initialized, an (e.g., each) upstream getter function may be used in a downstream getter, such that, from an outer cursor perspective, computation may be represented as a chain of lambda function calls. Upon completion of an initialization process, a cursor may iterate over input data and execute training or prediction logic by calling its getter function. At execution time, a chain of getter functions may be JIT-compiled (e.g., by a .NET runtime) to form an (e.g., a unique, highly) efficient function executing a whole pipeline (e.g., up to that point) on a (e.g., single) call. The process may be repeated, for example, until no trainable operator is left in the pipeline.

A DataView system may support any data size, for example, by streaming data. ML pipeline operators may efficiently handle high-dimensional and large datasets with cursoring. DataView supports streaming, for example, by cursoring through dataviews. A pipeline may support efficient multiple pass streaming (e.g., in support of very large datasets). The root of a view may be a loader that pulls information from a file or other data source. Loaders and savers may comprise, for example, binary idv (e.g., dataview interfaces) and text-based loaders and savers. Operating system cache may transparently enhance performance, for example, for repeated passes over a small dataset or a dataset that fits in primary memory (e.g., RAM).

Memory efficiency may be provided in a dataview system. Cursoring may provide efficient memory allocation. Creating a row cursor is an inexpensive operation relative to resource utilization. The expense may be incurred in the data movement and computation involved in iterating over the rows. For example, MoveNext( )(e.g., to move a cursor to a next row) may not require memory allocation. Retrieving primitive column values from a cursor may not require memory allocation. A caller may (e.g., optionally) provide (e.g., reusable) buffers to copy values (e.g., to retrieve vector column values from a cursor). A cursor may implement methods that provide values of the current row, e.g., when requested. Methods that serve up values may not require memory allocation on each invocation, for example, because they may use sharable buffers. This may significantly reduce memory allocations needed to cursor through data. Buffers may be shared or reused for other rows without additional memory allocation, for example, when the provided buffers are sufficiently large (e.g., buffer array lengths are long enough) to hold values. Cooperative buffer sharing may eliminate allocation of separate buffers for each row. Buffers may be allocated outside an iteration loop. DataView may allow ML algorithms to cursor through source data and (e.g., alternatively) build an in-memory representation of information. Vector data may be represented as sparse or dense vectors in values and indices arrays for buffers. Vector length may determine whether buffers arrays may be reused or discarded in favor of allocating larger buffer arrays.

ML model 215 (e.g., with a dataview system) makes data-based decisions (e.g., predictions), for example, based on input data 234. Input data 234 may be processed (e.g., transformed or featurized) by featurizer 210 to identify or create features for prediction model 205 to evaluate for predictions. A trained ML model is (e.g., essentially) a transformer that takes input data and returns predictions, where the transformer may comprise multiple operations. ML model 215 may comprise (e.g., all) information necessary to predict a label of a domain object (e.g., image or text) from input data 234. Thus, (e.g., trained) ML model 215 may contain transformations (e.g., data transformation(s) and prediction transformation(s)) to perform on input data 234 to arrive at predicted output. ML model 215 may include fixed and/or trainable parameters for (i) data featurization by a featurizer (e.g., one or more transformers that transform input data to create or identify features) and/or (ii) a prediction function (e.g., a prediction model). A data transformation (e.g., a transformer or a featurizer) may be fixed or trainable. A prediction model and may be fixed or trainable. A trainable prediction model may be referred to as a learner. A trainable transformer/featurizer may be referred to as an estimator.

ML model 215 may be created, for example, by a user of computing device 105. A user may, for example, create a composition of elements, components or operators, e.g., in the form of an ML pipeline, in an ML framework. Example ML model 215 is simplified, with a single pipeline. Other examples or implementations may have multiple (e.g., parallel) pipelines.

A pipeline (e.g., an ML pipeline) comprises all operators/operations utilized to fit a trainable model to a data set. A pipeline may comprise, for example, data import, fixed or trainable data transformation (e.g., data featurization) and prediction model(s) (e.g., fixed model or trainable/learning model). A trainable pipeline may be in a trained or untrained state, where a trained pipeline specifies trainable parameters of ML model 215. A pipeline may be trainable (e.g., comprise one or more trainable elements). For example, a trainable or learning pipeline may include one or more trainable transformers (e.g., estimators) and/or one or more trainable models or algorithms (e.g., trainers). A trained ML model is created when a trainable/learning pipeline is "fit" to training data (e.g., training data 231). A pipeline may be represented as a Direct Acyclic Graphs (DAGs) of operators, where an (e.g., each) operator may comprise a dataview interface executing a data transformation (e.g., string tokenization, hashing, etc.) or an ML model (e.g., decision tree, linear model, SVM, etc.). A pipeline may have a column perspective and an operator perspective, e.g., with respect to graph vertices. While operator chains may be defined linearly, a column schema may create a branching or DAG relationship. For example, column X may be computed (e.g., by an operator) from columns A and B. Column A may come from raw data exposed by a loader (e.g., loader 225). Column B may be computed (e.g., by an operator) from column C Thus, a column view may provide a branching DAG while a transform view may provide a linear chain. Upon initialization of an ML pipeline, operators composing a model DAG may be analyzed and arranged to form a chain of function calls which, at execution time, may be just-in-time (JIT) compiled to form a function executing the (e.g., entire) pipeline on a single call.

A chain refers to any assembly (e.g. of operators, dataviews or delegates) needed to produce value(s) in (e.g. current) rows of one or more active (e.g. selected) columns. A chain (e.g. a chain of operators, a chain of dataviews, chain of delegates) may be linear or nonlinear (e.g. a DAG). Stated another way, dependencies between chain elements (e.g. delegates) may be linear or nonlinear. A chain may also be referred to as, for example, a set, a group, a sequence, a network or a DAG.

In an example, for each requested column, there may be a delegate that encapsulates the computation needed to produce the value for that column Such a delegate may leverage/invoke/use zero or more delegates upstream in a dataview chain. A delegate for a second column may leverage/invoke/use some of the same delegates that the first column uses.

In an example described and shown below, suppose that columns requested from DV3 are columns C, D, E, F, and G. Column C in DV3 may be a "pass through" column from DV1. That is, the delegate for producing C from DV3 may be (e.g. is) the delegate used for producing C from DV1. Column D in DV3 may be a "pass through" column from DV2. That is, the delegate for producing D from DV3 may be the delegate used for producing D from DV2. Column E in DV3 may be computed from column D in DV2 and column A in DV1. Column F in DV3 may be computed from column B in DV1. Column G in DV3 may not use any columns upstream in the data view chain. In an example, column G may comprise, for example, a constant value or a randomly generated value. Column D in DV2 may be computed from column A in DV1 and column B in DV1. Dependency relationships are shown with dashed lines below:

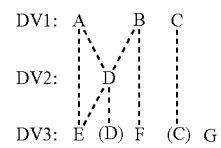

Thus, E uses (e.g. depends on) both D and A, D also uses A, as well as B, F uses B, and G doesn't use any upstream delegates. In an example, each dependency shown by dashed lines may be directional, such as in a DAG. For example, each dependency shown may flow upward, indicating the absence of cycles (e.g. mutual dependency of columns on each other).

A letter in parentheses indicates that a delegate is the same delegate as what the delegate points to, e.g., as opposed to being a delegate in its own right that leverages/invokes/uses the delegate it point to. Accordingly, the foregoing dependency relationships may be shown as follows, e.g., to be consistent at intermediate dataviews:

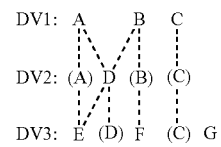

ML model 215 may comprise (e.g., as part of an ML pipeline), for example, featurizer 210 and prediction model 205. ML model 215 may be configured to perform training, test and prediction tasks, e.g., using training data 231, test data 232, or prediction data 233. ML model 215 is presented as a simple example with a single pipeline and a few operators. Other examples or implementations may be significantly more complex, e.g., with multiple pipelines, a significant number of operators and prediction models.

Featurizer 210 may create or extract features from input data 234 so that prediction model 205 may make predictions based on the features. A feature is a measurable property or characteristic of a phenomenon being measured, observed or analyzed by a model. Featurization or feature generation (e.g., from input data) may be important in the creation of accurate ML algorithms or prediction models (e.g., for pattern recognition, classification and regression). Multiple features may be referred to as a feature vector. A vector space or linear space is a collection of vector objects, which may be summed and multiplied ("scaled") by scalars. Features may be (e.g., represented by) numeric values (e.g., to facilitate processing and statistical analysis). A prediction model (e.g., prediction model 205) may be configured to expect features as a float vector. Data with categorical features may be featurized, for example, by one-hot encoding, hash-based one-hot encoding or binary encoding with a category index. A feature vector may be an n-dimensional vector of numerical features that represents an object. In an example, feature values for image data may correspond to image pixels. Feature values for text data may, for example, correspond to frequencies of occurrence of terms. Feature vectors may be combined with weights, for example, to construct a linear predictor function that may be used to determine a score for making a prediction. An N-gram feature may comprise a sequence of N contiguous items (e.g., phonemes, syllables, letters, words or base pairs) from text or speech data.

Featurizer 210 may process input data 234 into one or more features for prediction model 205. Featurizer 210 may comprise any number and type of operators, which may depend on a configuration of input data 234 and prediction model 205. In an example, e.g., as shown in FIG. 2, featurizer 210 may comprise loader 225, first transformer T1, second transformer T2 and so on to nth transformer Tn.

Although not shown, a context object (e.g., MLContext object) may provide a starting point for an ML application. A context object may provide a catalog of everything available. A context object may be used to read data, create estimators, save/load models, evaluate and perform all other tasks. A context object may contain a catalog object, which may catalog available operations and provide a factory to create components for data loading and saving, data preparation, feature engineering, transforms, training, evaluation and model operation (prediction), evaluation logging, execution control and so on. A (e.g., each) catalog object may comprise methods to create different types of components.

Data loader or loader 225 may indicate how to read input data 234. Input data 234 may be referred to as a dataset or source data, which may comprise (e.g., depending on a task ML model 215 is configured to perform) training data 231, test data 232 or prediction data 233. Input data 234 may comprise, for example, a file, a table (e.g., a collection of rows and columns), etc. Input data 234 may be unsuitable for direct use by prediction model 205. In an example data may be sparse, may contain irrelevant information and/or may otherwise be improperly formatted for prediction model 205. Input data 234 may (e.g., accordingly) be prepared or pre-processed into features before being used to find (e.g., trainable) parameters of prediction model 205. For example, input data 234 may be transformed (e.g., filtered, scaled normalized, encoded or otherwise manipulated) to provide features in a form expected by prediction model 205. In an example, redundant and/or irrelevant information in input data 234 may be filtered out, the dimensions of data may be reduced or expanded and/or data may be converted from text or string values to a numerical representation (e.g., floating point data or floats) that prediction model 205 may be configured to expect as input.

Loader 225 may represent input data 234 as a DataView, e.g., first DataView DV1. Loader 225 may load data from one or types of data or data formats (e.g., files, SQL tables, adhoc data generated on the fly) from one or more data sources (e.g., storage 230). Loader 225 may be schematized. Loader 225 may infer or specify (e.g., in a schema) columns, data types in columns and their locations in one or more input data sources (e.g., input data 234). Input data 234 may be (e.g., lazily) loaded, for example (e.g., only) when dataview output may be called for or requested (e.g., by a downstream pipeline operator). Data loaded as input data 234 from storage 230 may be limited to data necessary to provide requested dataview output.

First through nth transformers T1-$n$ may be used to prepare data for model training or prediction. First through nth transformers T1-$n$ may (e.g., each) apply a transform to convert an input dataview to an output dataview. ML pipeline operators such as transformers (e.g., first through nth transformers T1-$n$) consume one or more columns of one or more dataviews as input and create one or more columns of one or more dataviews as output. Dataviews are immutable, such that multiple operators at any point (e.g., downstream) in a pipeline may consume the same columns without triggering any re-execution. For example, first transformer T1 may operate on first dataview DV1 to generate as output second dataview DV2, second transformer T2 may operate on second dataview DV2 to generate as output third dataview DV3, etc., with nth transformer Tn operating on nth dataview DVn to generate as output a feature dataview DVf with one or more features (e.g., feature columns) for prediction model 205 to evaluate.

First through nth transformers T1-$n$ may (e.g., variously) be fixed or trainable. A trainable transformer may be created by training an estimator, as indicated by dashed boxes for first through nth estimators E1-$n$ above, respectively, each of first through nth transformers T1-$n$. Parameters determined for a transform during training (e.g., a fit( ) operation) may be used by a transformer (e.g., a transform( ) operation). Some transformers may operate without training parameters (e.g., converttograyscale transform). First through nth transformers T1-$n$ may perform any transformation. First through nth transformers T1-$n$ may, for example, concatenate, copy and rename, scale (e.g., normalize floats by scaling values between 0 and 1), convert or map to different data types, transform text to floats, tokenize text, hash data, transform images, encode data, insert missing values, etc. For example, a transformer may add a column and fill it with values computed from one or more columns in the input dataview. A text tokenizer transformer may, for example, take a text column and output a vector column with words extracted from the text column. In an example (e.g., as shown in FIG. 2), multiple transformers may be chained together (e.g., in a pipeline), which may create transformer dependencies on one or more other transformers.

First through nth transformers T1-$n$ may expect and produce data of specific types and formats, which may be specified in a schema (e.g., dataview schema). For example, each of first through nth transformers T1-$n$ in the ML pipeline may (e.g., must) have an input schema (e.g., data names, types, and sizes that the transform expects to see on its input) and an output schema (e.g., data names, types, and sizes that the transform produces after the transformation). An exception may be thrown, for example, when the output schema from a transform in a pipeline doesn't match an input schema for the next transform.

Regarding trainable transformers, first through nth estimators E1-$n$ are shown in dashed boxes to indicate each estimator may or may not be present in an implementation depending on whether parameters for a respective transform are variable or fixed. An estimator is a specification of a transformation (e.g., for data preparation transformation and machine learning model training transformation). An estimator may represent an untrained, but trainable or learning, transformer, which may be indicated by an IEstimator<TTransformer> Interface. An estimator may be fit on data to create/return a trained transformer. Parameters of an estimator or pipeline of estimators may be learned when Fit is called to return a trained transformer. An ML model or a prediction model may be (e.g., essentially) an estimator (e.g., a trainer) that learns on training data and produces a trained model, which, in turn, may be (e.g., essentially) a trained transformer.

Estimator input may comprise a dataview. Estimator output comprises a trained transformer. In an example, Fit(IDataView) may be called to train and return a transformer. In an example, given an estimator, a wrapping object may be returned that will call a delegate when Fit(IDataView) is called. An estimator may return information about what was fit. A Fit(IDataView) method may return a specifically typed object, e.g., rather than a general ITransformer. In an example (e.g., as shown in FIG. 2), multiple estimators may be chained together into an estimator pipeline (e.g., IEstimator<TTransformer> may be formed into pipelines with many objects). A chain of estimators may be constructed, for example, via EstimatorChain<TLastTransformer>. An estimator that will generate a transformer may be inside a chain of operators.

Prediction model 205 makes predictions based on features in or created from input data 234. Prediction model 205 and may be fixed or trainable. Trained or fixed prediction model 205 may receive feature dataview DVf as input and may generate as output a prediction dataview DVp. A trainable prediction model may be referred to as a learner. A fixed or trained prediction model is (e.g., essentially) a transformer that takes features and returns predictions. Prediction model 205 may comprise (e.g., all) information necessary to predict a label of a domain object (e.g., image or text) from one or more features. Prediction model 205 may include fixed and/or trainable parameters for its prediction function (e.g., algorithm). For example, prediction model 205 may comprise trainable weights applied to a linear regression model or split points in a decision tree.

In an (e.g., a simple) example, prediction model 205 may comprise a linear regression model that predicts house prices using house size and price data (e.g., Price=b+Size*w). Parameters b and w may be estimated (trained) by fitting a line on a set of (Size, Price) pairs. In this example, Size is a feature. Ground-truth values (e.g., empirical evidence) in training data may be referred to as labels. A label is an element to be predicted by a model, such as a future stock price. In this example, Price values in training data may be labels. In other examples and implementations, input data, features and the prediction model may be much more complex.

A trainable prediction model may be trained by a trainer, as indicated by dashed box for trainer 206 above (e.g., fixed or trainable) prediction model PM. Parameters determined for trainable prediction model PM during training (e.g., a fit( ) operation) may be used to make predictions for prediction data.

Trainer 206 may accept a dataview input (e.g., feature dataview DFf) and produce a trained prediction model (e.g., prediction model PM). Trainer 206 may accept, for example, a feature column, a weight column and a label column. Trainer 206 executes an algorithm applied to a task. Prediction model PM, which operates on features, may be applied to different tasks. In an example, a Stochastic Dual Coordinated Ascent (SDCA) algorithm (optimization technique for convex objective functions) may be used for various tasks, such as Binary Classification, Multiclass Classification and Regression. Output of prediction model PM may be interpreted (e.g., differently) according to the task. Trainer 206 may execute a training algorithm and perform interpretation. For example, SdcaRegressionTrainer may use the SDCA algorithm applied to a Regression task.

A trainable transform (e.g., featurizer 210) and/or a trainable prediction model (e.g., prediction model 205) may be trained before generating an output DataView. An output dataview may, for example, comprise one or more additional columns added to an input dataview. An ML pipeline (e.g., ML model 215) submitted for execution (e.g., by calling Train) may, for example, lead to training each trainable transform/learner in topological order. A one-time initialization cost may be incurred for each trainable operator in ML model 215 to analyze the cursors in the pipeline, e.g., each cursor may check active columns and expected input type(s). Training may determine, generate, identify or fit a model for a given training data set (e.g., training data 231). Training may involve, for example, binary classification, multiclass classification, anomaly detection, clustering, forecasting, ranking, regression, recommendation, etc. In an example of a linear model, training may comprise finding weights. In an example of a tree, training may comprise identifying split points. Training may occur, for example, by calling Fit( ) with training data 231 as input data 234 to estimate parameters of ML model 215. A resulting model object may implement a Transformer interface.

A model composition (e.g., ML model 215) may be compilable into a chain of dataviews (e.g., DV1-DV2-DV3 . . . DVn-DVf-DVp) based on input data 234. A chain of dataviews may comprise a chain of delegates pointing to a chain of delegate functions.

Runtime (e.g., for a training, testing or prediction task) may interpret ML model 215 as a directed acyclic graph (DAG) of operators (e.g., as opposed to executable code). At runtime, ML model 215 may be registered. Runtime may apply optimizations over ML model 215, such as operator reordering (e.g., to improve latency) or operator and subgraph sharing, for example, to improve memory consumption and computation reuse (e.g., through caching). Pipeline compositions may be converted into model plans. An Object Store may save and share parameters among plans. A Runtime may manage compiled plans and their execution. A Scheduler may manage dynamic decisions on how to schedule plans (e.g., based on computing device workload). An ML framework FrontEnd may receive and submit prediction requests to ML model 215. An application (e.g., application 110) may request predictions by including the Runtime in its logic.

A pipeline composition may indicate a workflow. A workflow is a pattern of activity (e.g., a procedure or process). In an example workflow (e.g., for model development and deployment), data (e.g., training data 231) may be prepared for a trainable model (e.g., ML model 215). Data may be loaded through a DataView object (e.g., first dataview DV1). A pipeline of data transformations that utilize DataViews (e.g., featurizer 210) may featurize data for an ML algorithm (e.g., prediction model 205). Transformers (e.g., first through nth transformers T1-n) may (e.g., in addition to a trainable model such as prediction model PM) be trained by training data (e.g., using first through nth estimators E1-n to generate first through nth transformers T1-n). The ML pipeline with trainable featurizer and/or trainable prediction model, which defines the workflow, may be trained, for example, by calling fit( ) on the ML pipeline (e.g., ML model 215). Following training, trained ML model 215 may be evaluated, for example, using test data 232. There may be multiple iterations of training and evaluation to improve performance. A trained and evaluated model may be saved (e.g., in binary format) for use in or by an application (e.g., application 110). The model may be loaded into a transformer object. The loaded model may make predictions, for example, by calling CreatePredictionEngine.Predict( ) based on prediction data 233.

FIGS. 3 and 4 show examples of a dataview entries filled with delegates, for example, compared to entries with materialized values created with delegate functions. FIG. 3 shows a simple example dataview of prediction dataview DVp in FIG. 2 (in table form) representing a chain of delegates for the chain of dataviews shown in FIG. 2, according to an example embodiment. FIG. 4 shows a simple example dataview DVp of materialized values for prediction dataview DVp (in table form) based on cursoring and execution of a chain of delegate functions, according to an example embodiment.

The example dataview DVp in FIG. 3 represents a simple example of prediction dataview DVp in FIG. 2. Various implementations of dataviews may have any number of columns and rows. Column names include C1, C2, C3-Cn, Feature and Label. In an example, column names C1, C2, C3-Cn, Feature and Label may correlate, respectively, for example, with first through nth dataviews DV1, DV2, DV3-DVn, feature dataview DVf and prediction dataview DVp, where each dataview adds one column to a previous dataview in this simple example. In other examples, there may or may not be a one-to-one correlation between columns and dataviews, for example, given that a dataview may generate multiple columns. In various implementations, columns exposed by different dataviews may or may not "flow through" to the next dataview. For example, a source dataview may have columns A and B, while the next dataview may expose only newly computed columns D, E, and F, while the next dataview may or may not expose columns A and B.

In an example, loader 225 may create first dataview DV1 and column C1, where first delegate D1 represents a computation that would (e.g., selectively) fill rows of first column C1 with text input (e.g., xyz, abc, foo) from source data (e.g., training data 231, test data 232 or prediction data 233). First transformer T1 (e.g., after being trained by first estimator E1) may create second dataview DV2 and column C2, where second delegate D2 in second column C2 represents a computation that would (e.g., selectively) fill rows of second column C2 with numerical representations (e.g., 0, 1, 2) of text input (e.g., xyz, abc, foo) in first column C1 obtained from first dataview DV1. Second transformer T2 (e.g., after being trained by second estimator E2) may create third dataview DV3 and third column C3, where third delegate D3 in third column C3 represents a computation that would (e.g., selectively) fill rows of third column C3 based on one or more columns of first or second dataviews DV1 or DV2. Nth transformer Tn (e.g., after being trained by nth estimator En) may create feature dataview DVf and Feature column, where feature delegate Df represents a computation that would (e.g., selectively) fill rows of Feature column Cf based on one or more columns of first through nth dataviews DV1 through DVn. In an example, nth transform Tn may transform numerical values in second column C2 into vectors, e.g., by converting the numerical values to one-hot vector values. Prediction model PM (e.g., after being trained by trainer 206) may create prediction dataview DVp and prediction column Label, where prediction delegate Dp represents a computation that would (e.g., selectively) fill rows of prediction column Label based on evaluation of one-hot vector values in feature column in feature dataview DVf. In an example, prediction model PM may comprise a binary classifier that classifies one-hot vector values as 0 or 1.

Example prediction dataview DVp represents the last dataview in a chain of dataviews (e.g., first through nth dataviews DV1, DV2, DV3-DVn, feature dataview DVf and prediction dataview DVp). Example prediction dataview DVp shows a chain of delegates (e.g., D1, D2, D3-Dn, Df and Dp) to an input data source (e.g., storage 230).

In an example, such as where a user (e.g., of computing device 105) requests values in Feature column, delegate chaining may be performed to determine which dataviews, delegates and columns are necessary to fulfill the request for materialized value(s). In a simple linear example of delegate chaining, delegate chaining may involve feature delegate Df calling nth delegate Dn and so on, third delegate D3 calling second delegate D2, second delegate D2 calling first delegate D1, and first delegate D1 accessing storage data 230 (e.g., for one of training data 231, test data 232 or prediction data 233 depending on the task) for input data 234. With dataviews, delegates and columns known, first delegate may load input data 234, providing the value(s) to second delegate D2, second delegate D2 may process the loaded input data into numerical values, providing the numerical values to third delegate D3 and so on, nth delegate may provide its output to feature delegate DVf, feature delegate DVf may process those values and provide the resulting values in response to the request. In various implementations, delegate chaining may or may not be linear and delegates may call one or more other delegates. In an example, Df may call D7, D7 may call D4 and D3, D4 may call D1, and so on. Each dataview may contribute one or more delegates and one or more columns.

Figure 5:
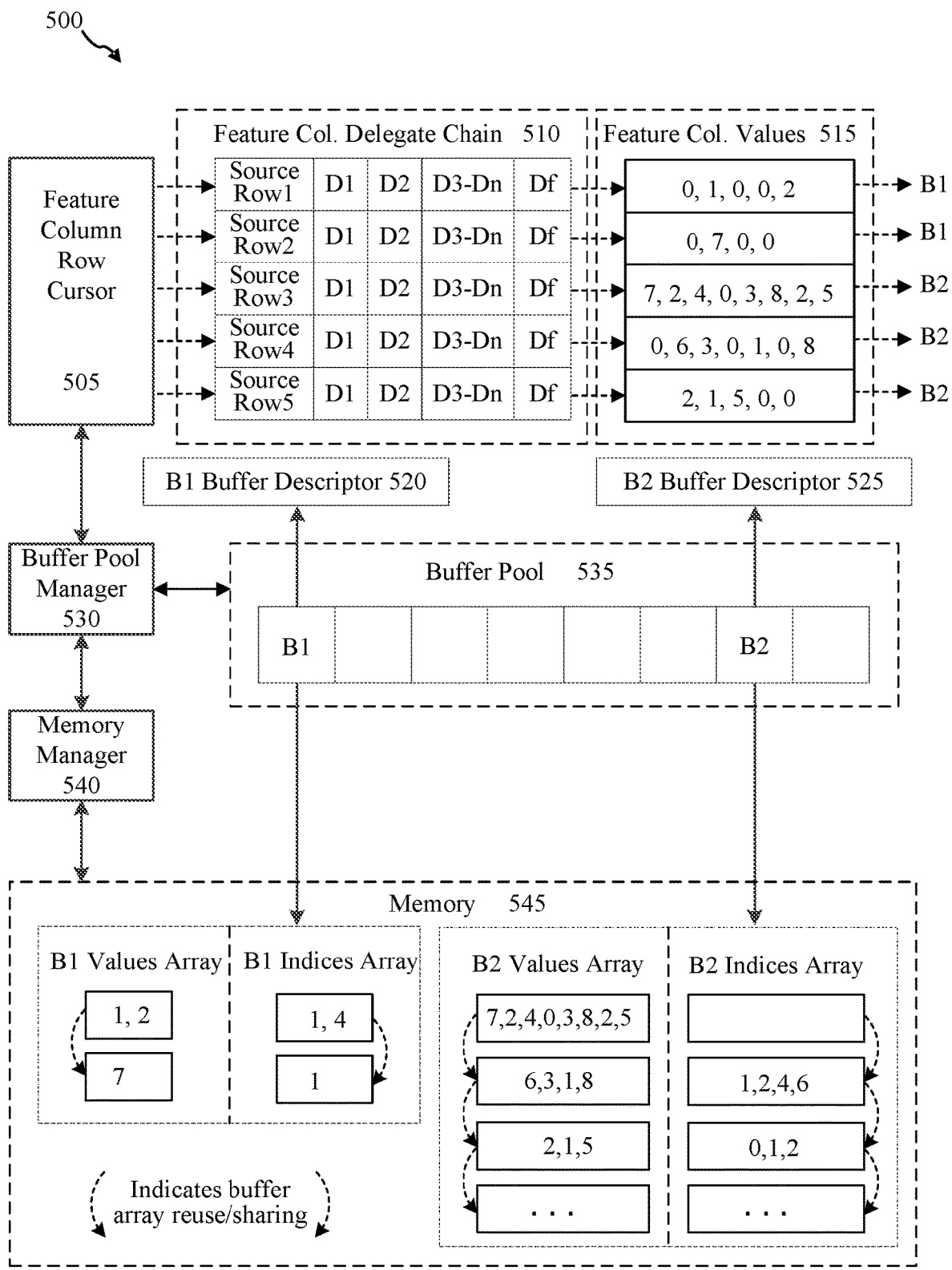
FIG. 5 shows a block diagram of buffer sharing and sparse data handling, according to an example embodiment.

As illustrated by example in FIG. 4, values materialized in first column C1 by executing the first delegate function referenced by the first delegate may comprise, for example, xyz, abc, foo, klm, pqr, etc. Values materialized in second column C2 (e.g., by executing the first delegate function referenced by first delegate D1 and the second delegate function referenced by second delegate D2) may comprise, for example, 0, 1, 2, 3, 4, etc. Values materialized in feature column Feature (e.g., by executing the first delegate function referenced by first delegate D1 through the feature delegate function referenced by feature delegate Df) may comprise, for example, variable length vectors, e.g., first vector 0,1,0, 0,2, second vector 0,7,0,0, third vector 7, 2, 4, 0, 3, 8, 2, 5, fourth vector 0, 6, 3, 0, 1, 0, 8, fifth vector 2, 1, 5, 0, 0, etc. Values materialized in the label column Label (e.g., by executing the first delegate function referenced by first delegate D1 through the prediction delegate function referenced by prediction delegate Dp) may comprise, for example, 0, 1, 1, 0, 1, etc. Note that all of the values shown in FIG. 5 are provided for purposes of illustration, and are not intended to be limiting.

As mentioned above, embodiments may be configured to accommodate the sharing of buffers and the efficient handling of sparse data. Such embodiments may be configured in various ways. For instance, FIG. 5 shows a block diagram of a system 500 configured for buffer sharing and sparse data handling, according to an example embodiment. Example system 500 shows an example of sparse data handling and buffer reuse while processing five rows of feature column in feature dataview DVf, e.g., continuing the example shown in FIGS. 1-4. Example system 500 is simplified to present features. Example system 500 shows a feature column row cursor 505, a feature column delegate chain 510, a feature column values 515, a buffer descriptor 520 (B1), a buffer descriptor 525 (B2), a buffer pool manager 530, a buffer pool 535, a memory manager 540 and a memory 545. System 500 is described in detail as follows.

Feature column delegate chain 510 is configured to present the delegate chain shown in the ML pipeline shown in FIG. 2 from source data in storage 230 to feature dataview DVf, with materialized values of the delegate chain, such as those presented in FIG. 3. Feature column delegate chain 510 shows five rows of source data processed by a delegate chain comprising first delegate D1 through feature delegate Df, as feature column row cursor 505 cursors row by row through Feature column. Other numbers of rows may be present in other embodiments, depending on the particular situation. The exemplary delegate chain and materialized results were previously shown and discussed with respect to examples in FIGS. 3 and 4. Feature column delegate chain 510 generates materialized values for Feature column, as shown in feature column values 515.

Feature column values 515 shows values in five rows of Feature column. The value type in Feature column is variable length vectors. DataView Feature column variable length vector values in the five rows are computed by a chain of delegate functions referenced by delegates D1-Df accessed through feature column row cursor 505. The values may be buffered (e.g., during processing). Buffer types may vary with value types. Indications of which buffers store the five values are provided, e.g., row 1 and row 2 feature column values are stored in first buffer B1 while row 3-5 feature column values are stored in second buffer B2. As discussed below, how to store values (e.g., as dense or sparse vectors) and which buffers will store values may be selected or identified, for example, by a cursor (e.g., feature column row cursor 505). Although the example shown in FIG. 5 shows variable length data for feature column values 515, feature column values 515 may comprise fixed length data.

Feature column row cursor 505 may (e.g., along with buffer pool manager 530) coordinate buffer sharing and sparse data handling. A cursor (e.g., a row cursor such as feature column row cursor 505) may be opened on a DataView (e.g., feature dataview DVf) with an active column (e.g., Feature column), the cursor may get a delegate for the Feature column (e.g., through a GetGetter method), and the cursor may use the delegate multiple times to fetch the actual values (e.g., variable length vectors) in the column (e.g., Features column) as MoveNext moves the cursor from one row to the next. In an example implementation, row cursors may provide memory management functionality. For example, a dataview cursor (e.g., feature column row cursor 505) or a delegate function may determine (e.g., in cooperation with buffer pool manager 530) how to represent vectors, when to create, reuse, and discard/abandon buffers and/or arrays and what size arrays should be. A dataview cursor (e.g., feature column row cursor 505) and/or a delegate may communicate requests/instructions (e.g., regarding buffers and arrays) to buffer pool manager 530 and/or memory manager 540.

Buffer pool manager 530 may manage buffer pool 535 and coordinate with cursors (e.g., feature column row cursor 505). Buffer pool manager 530 may, for example, manage (e.g., allocate and free) data structures (e.g., buffer descriptors) and arrays for buffers. A buffer descriptor (e.g., B1 buffer descriptor 520, B2 buffer descriptor 525) may describe information about a buffer and its state. An array may comprise memory (e.g., memory 540) referenced by a buffer descriptor. Buffer pool manager 530 may allocate and abandon buffers and arrays, for example, according to requests by a dataview cursor (e.g., feature column row cursor 505).

Buffer pool manager 530 may create a buffer descriptor for an array. Buffer pool manager 530 may communicate with a dataview cursor (e.g., feature column row cursor 505), for example, to determine which information buffer pool manager 530 should reference in a buffer descriptor and what data to copy (e.g., into one or more arrays in memory 540). For example, buffer pool manager 530 may create first buffer descriptor 520 for first buffer B1 values array and first buffer B1 indices array, e.g., based on a request from feature column row cursor 505. Buffer pool manager 530 may create second buffer descriptor 525 for second buffer B2 values array and second buffer B2 indices array, e.g., based on a request from feature column row cursor 505.

A buffer descriptor may include, for example, data defining a buffer state, a reference to memory locations (e.g., one or more pointers), among other information, such as read and/or write access settings, a relationship to a cursor and so on. First buffer descriptor 520 for first buffer B1 may maintain associations between first buffer B1 and its address space. Second buffer descriptor 525 for second buffer B2 may maintain associations between second buffer B2 and its address space. In an example, first buffer descriptor 520 may have multiple memory location references (e.g., a first reference to B1 values array and a second to B1 indices array in memory 540). Second buffer descriptor 525 may have multiple memory location references (e.g., a first reference to B2 values array and a second to B2 indices array in memory 540).

Buffer pool 535 may comprise a portion of virtual address space allocated to an application (e.g., application 110 that integrates an ML model 115). Buffer pool 535 may cache values for recently or frequently computed dataview columns.

Buffer pool 535 may comprise a data structure that defines a collection of logical buffers in which data resides for access by applications, such as application 110. Buffer pool 535 may reference an array of buffers, such as, for example, first buffer B1 and second buffer B2. A logical buffer may comprise a data structure (e.g., first buffer descriptor 520 for first buffer B1 and second buffer descriptor 525 for second buffer B2) with (e.g., among other information) a state and a reference to a set of locations (e.g., a region or span) in memory (e.g., one or more arrays). In an example, memory locations of a buffer may refer to memory 540.

Memory manager 540 may allocate and reclaim allocated memory. Memory manager 540 may comprise, for example, an operating system (OS) virtual memory manager (VMM) and processor memory management unit (MMU) to manage virtual and physical memory, such as memory 545. Memory manager 540 may communicate with buffer pool manager 530 and control memory 545, for example, to provide requested memory resources.

A program (e.g., an application such as application 110 or ML model 105) executed by one or more processors (e.g., CPUs in computing device 105) may be referred to as a process. A process may be divided into tasks (e.g., sequences of instructions) that may be executed (e.g., concurrently) as threads. Processes (and threads) may be assigned portions of memory to accomplish their respective functions or tasks. Primary (main) memory resources may be insufficient for all processes. Secondary memory may supplement primary memory to provide sufficient memory assigned to processes. Available primary and secondary memory may be discontinuous (fragmented).

Virtual memory may simplify processes by appearing to provide each process with its own continuous block of main memory, even though the virtual memory block may actually map to disparate portions of primary and/or secondary memory and even though the total virtual (primary) memory may exceed actual (physical) memory. A VMM and MMU may manage memory for processes, including mapping from virtual addresses to physical addresses. A process may operate based on virtual memory specified by an OS while a CPU may interface with the OS to fetch and execute instructions from physical (e.g., primary or secondary) memory.

Memory manager 540 may manage memory by allocating and releasing memory (e.g., buffers). In an example, memory management may be performed by a runtime (e.g., CLR) for an ML model within a managed code framework, such as .NET. Memory management for .NET may be performed, at least in part, by a garbage collector. As available memory decreases (e.g., below a threshold), garbage collection may be performed (e.g., automatically) to free up memory for allocation (e.g., to new or existing objects). Garbage collection may search for objects (e.g., in a managed heap) that are no longer used and perform operations to reclaim memory assigned to the objects. Dataview cursors (e.g., feature column row cursor 505) and buffer pool managers (e.g., buffer pool manager 540) may cooperate with memory manager 540 to reduce memory allocations and reclamation.

Memory 545 may comprise, for example, primary memory and secondary memory. Examples of primary memory include SRAM, DRAM, zero-capacitor RAM (Z-RAM) and capacitor-less twin-transistor RAM (TTRAM). Examples of secondary memory (e.g., storage) may comprise, for example, slower access, but larger and non-volatile (e.g., permanent storage) memory devices that may be indirectly accessed by a processor, such as a hard disk drive (HDD), solid state drive (SSD), optical drive, ROM, flash memory, non-volatile memory (NVM) or other non-volatile storage.

In an example, portions of memory 540 may be utilized for (e.g., vector) arrays. For example, a buffer (e.g., first buffer B1, second buffer B2 in buffer pool 535) may comprise or reference a values array and an indices array (e.g., B1 values and indices arrays and B2 values and indices arrays). Buffer arrays may be utilized, for example, to store values determined based on computations for dataviews in an ML pipeline.

Performance may be improved, for example, by reducing memory allocations, abandonment and garbage collection. Creation and destruction of buffers (e.g., arrays) consumes resources. Memory efficiency may be improved by representing sparse data (e.g., vectors) with significantly less memory (e.g., by buffering sparse data in values and indices arrays) and by re-using buffers, for example, when processing data in an ML pipeline (e.g., while cursoring row to row through dataviews).

A (e.g., each) column in a DataView interface (IDataView) may have an associated type. For example, a vector type of values in feature column values 515 may be represented by a vector buffer VBuffer<T>. A VBuffer<T> may be a generic type that represents dense and sparse vectors over items of type T. A vector type may not mandate denseness or sparsity. A sparse representation may be semantically equivalent to a dense representation having suppressed entries filled in with a default value of the item type. First buffer B1 and second buffer B2 may be implemented with VBuffers.

A VBuffer may comprise multiple (e.g., a set of) arrays. A first (e.g., value) array may indicate values (e.g., vector values) while a second (e.g., indices) array may indicate locations (e.g., vector indices) of values in a (e.g., sparse) dataset (e.g., vector). A VBuffer representation of a dense vector may not specify an indices array (e.g., of locations) or may specify a length of zero for an indices array.

A VBuffer structure may be immutable (e.g., read only). A VBuffer may have a property indicating whether it is dense or sparse. A VBuffer may have a Length field indicating a logical length of a buffer. A VBuffer may have a Count field indicating the number of items explicitly represented. Count for a values array may be equal to Length, for example, for a dense representation, and less than Length for a sparse representation. Length for an indices array may be greater than or equal to Count for an indices array, for example, for a sparse representation. VBuffer values may be accessed, for example, via GetValues and/or GetIndices methods. GetIndices may not be used for a dense representation.

A vector may be represented as dense or sparse. In an example, a vector with five values 0, 1, 0, 0, 2, respectively, at indices 0, 1, 2, 3, 4 may be represented as dense or sparse in vector declarations:

var a=new VBuffer<float>(5, new float[ ] {0, 1, 0, 0, 2})
var b=new VBuffer<float>(5, 2, new float[ ] {1, 2}, new int[ ] {1, 4})

Var a is a dense representation while var b is a sparse representation. Sparse representation omits default values (e.g., 0 values) and identifies locations of non-default values 1 and 2 at logical indices 1 and 4. Operations based on dense or sparse representations may treat values of logical indices 0, 2 and 3 as 0.0 (e.g., a default value).

Representing sparse data as an array of values and an array of indices may significantly reduce memory allocation as the size of sparse data increases. For example, a vector may have millions of entries with mostly missing values or default values (e.g., zero, false, empty strings and so on depending on data type) and only hundreds or thousands of non-default values (e.g., non-zero, true, string values) present. Rather than allocate memory for millions of entries, a value array and indices array may be allocated for the hundreds or thousands of non-default (e.g., non-zero) value entries present in the vector.

Buffers, such as first buffer B1 and second buffer B2, may be used (and re-used) to process data in an ML pipeline (e.g., ML pipeline 105). In an example, buffer re-use may be enabled or disabled. Obtaining (getting) getters and values before commencing iteration may facilitate buffer sharing and (e.g., also) column-type validation once rather than many times.

An instance of VBuffer<T>, such as first buffer B1 and second buffer B2, may be passed to a row cursor getter, which may be free to take ownership of and re-use arrays associated with VBuffer<T>, for example, when they are large enough.

First and second buffers B1 and B2 may be re-used, which may reduce memory allocations and garbage collection. In an example, there may be a dataview (e.g., feature dataview Dye in variable data (e.g., variable length vectors). A first column (e.g., Feature column) may have a representation type VBuffer<float>. An instance of a VBuffer may be passed (e.g., in a call) to a row cursor getter. Buffer ownership is transferrable, e.g., from caller to callee. A call recipient (e.g., callee) may take ownership of and re-use a VBuffer. A value getter may open a cursor (e.g., feature column row cursor 505), for example, with instruction to make only the first column (e.g., Feature column) active. Code may (e.g., then) get the getter delegate (e.g., Df, D3-Dn, D2, D1) over the first column, the getter delegate accessing and placing values in VBuffer<float> (e.g., first buffer B1 or second buffer B2).

A while loop may call movenext to move a cursor (e.g., feature column row cursor 505) row by row over the data in the first (e.g., Feature) column. The same value variable may be (e.g., repeatedly) passed to a getter delegate (e.g., Df) that gets the values in the first (e.g., Feature) column. Memory arrays e.g., B1 values array and B1 indices array) may be allocated for initial arrays to store vector values and locations in allocated arrays (e.g., B1 values array and B1 indices array). An initially allocated array (e.g., B1 values array and B1 indices array) may be too small for values in a subsequent row (e.g., row 3). Memory may or may not be reallocated (e.g., multiple times) for larger arrays (e.g., B2 values array and B2 indices array) as the cursor proceeds through rows, for example, until allocated arrays (e.g., B2 values array and B2 indices array) are large enough to proceed through remaining rows (e.g., rows 3, 4 and 5) while sharing allocated arrays without further reallocation and without garbage collection of additional abandoned allocated arrays.

In an (e.g., alternative) example, first buffer may be reused and new (e.g., larger) arrays may be allocated to first buffer B1, e.g., as opposed to allocating second buffer B2 and second set of arrays (e.g., B2 values array and B2 indices array). In this way, first buffer may be re-used and only first set of arrays would be abandoned, replaced by a second set of arrays. In an (e.g., another alternative) example, a set of arrays may be reassigned from a first buffer to a second buffer.

With reference to the example in FIG. 5, it may be observed that variable length vector values in rows 1 and 2 are stored in first buffer B1, backed by B1 values array and B1 indices array, while variable length vector values in rows 3, 4, 5 and beyond are stored in second buffer B2, backed by B2 values array and B2 indices array. Feature column row cursor 505 and/or delegate(s) called may use and reuse first buffer B1 and its associated arrays (e.g., B1 values array and B1 indices array) for variable length vectors that fit in B1 values array and B1 indices array. Feature column row cursor 505 or a delegate may abandon/release first buffer B1 and/or its arrays and request that buffer pool manager 530 allocate second buffer B2 or that memory manager 540 allocate or reallocate (e.g., larger) arrays for first buffer B1, for example, upon determining that the current arrays may be too small to store the vector in row 3. Buffer pool manager 530 may, for example, allocate second buffer B2 or memory manager 540 may allocate or reallocate appropriate length arrays (e.g., by resizing B1 arrays or by allocating B2 values array and B2 indices array for second buffer B2). Cursor and delegate may continue using B1 (e.g., with resized/reallocated arrays) or may abandon first buffer B1 and associated arrays B1 values array and B1 indices array and use (e.g., instead) second buffer B2 with its associated set of arrays. Feature column row cursor 505 may continue to use a buffer with larger arrays (e.g., first buffer B1 with resized/reallocated arrays or second buffer B2 with B2 set of arrays), for example, until encountering a vector too large to store (e.g., in a dense or sparse representation) in an existing array or set of arrays.

With reference to the example in FIG. 5, it may be observed that variable length vectors in rows 1, 2, 4 and 5 are represented as sparse vector values while row 4 variable length vector is represented as a dense vector in buffer arrays. Feature column row cursor 505 may determine whether to represent vectors as sparse or dense based on, for example, memory efficiency (e.g., fitting in existing buffer arrays). For example, a dense vector or a vector that may fit as is in an existing values array may be represented as a dense vector. Vectors that may not fit as is in values array, and that may be sparse to one degree or another, may be condensed into a sparse representation that fits in existing arrays. Otherwise (e.g., when a vector does not fit in a dense or sparse representation in existing arrays) new arrays (e.g., with or without a new buffer) may be allocated (e.g., by buffer pool manager 530).

In an example implementation, delegate functions maybe involved in determining array length and requesting arrays for buffers passed to delegates by cursors. For example, when iterating over a dataset, a column may have vector lengths up to one million, while the highest number of non-zero values in any of the vectors may be 10. A cursor may pass in a reference to a VBuffer for the first time to a delegate. The first time a buffer is passed in there may not be arrays associated with the buffer. A delegate (e.g., in a delegate chain) that computes the vector may determine a length for values and indices arrays, request allocation of the set of arrays (e.g., to hold at least three elements), fill the set of arrays with the computed vector values in, then return back (e.g., to cursor). A cursor may reuse the buffer and the arrays in future calls to the delegate or other delegates to compute values for other rows. Move next may be called to advance the cursor to the next row. The delegate may be called (e.g., again) to get a column value for the current row. A reference to the same VBuffer used for the previous row may be passed in. The current row vector may have five non-zero values. The delegate function may compare array length to determine whether to reuse or reallocate/reset arrays. In this example, delegate request a new allocation of arrays or a reallocation of the arrays to increase array sizes (e.g., from a length of three to five) to store five-element vectors. The delegate may load the values into the five-element arrays and return. The caller may call move next to move the cursor to a next row. The delegate may be called (e.g., again) to get values for the column in the current row, which may have only two non-zero values. The delegate may determine the present set of arrays are long enough to reuse. The delegate may fill the existing set of arrays with the two-element vector. The delegate may indicate the arrays have two active elements in the five-element arrays. The delegate may return. The caller may (e.g., as each value is buffered), use the values. The caller may call move next to move the cursor to the next row. The cursor may call the delegate (e.g., again). The procedure continues. The delegate may end up allocated a ten-element set of arrays and may continue reusing the same set of arrays.

In an example code implementation of buffer reuse to improve performance similar to the example presented in FIG. 5, a method that accesses a value in a dataview may fill in values through a reference (ref) parameter (e.g., as opposed to a return value):

```
using (DataViewRowCursor cursor =
data.GetRowCursor(data.Schema[5]))
{
    ValueGetter<VBuffer<float>> getter =
    cursor.GetGetter<VBuffer<float>>(5);
    VBuffer<float> value = default;
    while (cursor.MoveNext())
    {
        getter(ref value);
        // . . .
    }
}
``` where a ValueGetter may be defined as follows:
public delegate void ValueGetter<TValue>(ref TValue value)

In the foregoing example code, a cursor is opened with column 5active. A "getter" delegate is obtained over active column 5 Buffer re-use is enabled, for example, by passing in the same value variable as a reference (ref) to the getter delegate, again and again, as the cursor moves row by row over the data per the while loop. Memory may be allocated for the first row, or several rows. Initially, VBuffer<float>value=default, meaning it may have zero Length and empty spans. At some point (e.g., the first call) value may be replaced with a VBuffer<float> with actual values, which may be stored in (e.g., freshly) allocated buffers. In subsequent calls, the buffers may be judged insufficiently large (i.e. too small). New arrays may be (e.g., internally) allocated. At some point (e.g., after several calls) the arrays may be deemed "large enough," at which point there may be no further buffer allocations, which may minimize garbage collection.

A while loop may call movenext to move a cursor (e.g., feature column row cursor 505) row by row over the data in the first (e.g., Feature) column. The same value variable may be (e.g., repeatedly) passed to a getter delegate (e.g., Df) that gets the values in the first (e.g., Feature) column. Memory arrays e.g., B1 values array and B1 indices array) may be allocated for initial arrays to store vector values and locations in allocated arrays (e.g., B1 values array and B1 indices array). An initially allocated array (e.g., B1 values array and B1 indices array) may be too small for values in a subsequent row (e.g., row 3). Memory may or may not be reallocated (e.g., multiple times) for larger arrays (e.g., B2 values array and B2 indices array) as the cursor proceeds through rows, for example, until allocated arrays (e.g., B2 values array and B2 indices array) are large enough to proceed through remaining rows (e.g., rows 3, 4 and 5) while sharing allocated arrays without further reallocation and without garbage collection of additional abandoned allocated arrays. Note that placing the var value declaration inside the while loop may lead the getter to allocate arrays each time, preventing buffer reuse.

A further implementation example of getter delegate operation for buffer re-use is presented. In an example, VBuffer<T> may be an immutable (e.g., read only) structure. "Buffer reuse" may imply mutability, which may be accomplished, for example, with VBufferEditor<T>. VBuffer<T> may be immutable (e.g., ReadOnlySpan) for values and indices while VBuffer<T> may be editable/mutable (e.g., Span) for values and indices.

Span<T> may provide a type- and memory-safe representation of a contiguous region of (e.g., arbitrary) memory. Span<T> may comprise a ref structure allocated on a stack (e.g., rather than on a managed heap). Span<T> may comprise an abstraction over an arbitrary block of memory. A Span<T> instance may be used to hold the elements of an array or a portion of an array. Unlike an array, however, a Span<T> instance may point to managed memory, native memory, or memory managed on the stack. Span<T> may wrap an entire array. Span<T> may point to any contiguous range within an array. GetValues( )and GetIndices( ) may (e.g., always) return spans that have the same length for sparse VBuffers.

ReadOnlySpan<T> may comprise a read only version of Span<T>. ReadOnlySpan<T> may provide a type-safe and memory-safe read-only representation of a contiguous region of arbitrary memory. ReadOnlySpan<T> may comprise a ref structure allocated on a stack (e.g., rather than on a managed heap). ReadOnlySpan<T> may comprise an abstraction over an arbitrary block of memory. A ReadOnlySpan<T> instance may be used to reference the elements of an array or a portion of an array. Unlike an array, however, a ReadOnlySpan<T> instance may point to managed memory, native memory, or memory managed on the stack.

A VBuffer's values array and indices array may be reused to create a new VBuffer. In an example, a VBufferEditor<T> structure may be created. A VBufferEditor<T> may comprise a lightweight, stack-only structure that may (a) give access to public Span<T> Values and public Span<int> Indices so code can modify individual elements in the buffers; (b) check or ensure Values and Indices arrays have appropriate capacity; and/or (c) create new VBuffer instances using its cached buffers.

A VBuffer<T> may be passed in as a ref parameter to VBufferEditor<T>. The editor, past that statement, may be considered to "own" the internal structure of the VBuffer<T> passed in (e.g., own values and indices arrays underlying the VBuffer). Code may not continue to use the input VBuffer<T> structure from that point onwards.

New values may be placed in Span<T>. New indices may be placed in Span<int>, on that editor, for example, when a sparse vector is the desired result.

A Commit method may be called to get another VBuffer, with values and indices accessible through VBuffer<T> methods, e.g., same as those set in the editor structure.

Creating a VBufferEditor<T> out of a VBuffer<T> may render the passed in VBuffer<T> invalid. Likewise, getting the VBuffer<T> out of the editor out of the VBufferEditor<T>, e.g., through a Commit method, may render the editor invalid. "Ownership" of the internal buffers may be passed (e.g., in both cases) along to a successor structure, rendering the original structure invalid, e.g., in some sense.

Internally, buffers may be backed by arrays that are reallocated (e.g., as needed) by the editor upon its creation. Arrays may be reused, for example, when they are large enough.

In an example implementation, a caller (e.g., ValueGetter delegate as caller) may be assumed (e.g., by default unless otherwise specified) to own a VBuffer returned by ref. A caller (e.g., as owner) may have complete control, for example, to pass the same variable into another getter, or modify its values.

Passing in an existing VBuffer<T> to a ValueGetter delegate by reference may provide implementation control over it to use or reallocate (e.g., as necessary) to store a resulting value. The caller may be considered to own a buffer, for example, when the delegate returns with the returned value.

Creating distinct (e.g., source and destination) buffers that share references to their internal arrays (e.g., declaring destination=source) may compromise a caller's ability to use a (e.g., source) VBuffer it owns. The contents of the source could be modified, for example, if the caller were to pass the destination into another method that modified it.

Implementations are not limited to the examples shown. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines. Examples shown and discussed with respect to FIGS. 1-4 may operate, for example, according to example methods presented in FIGS. 5-7.

Figure 6:
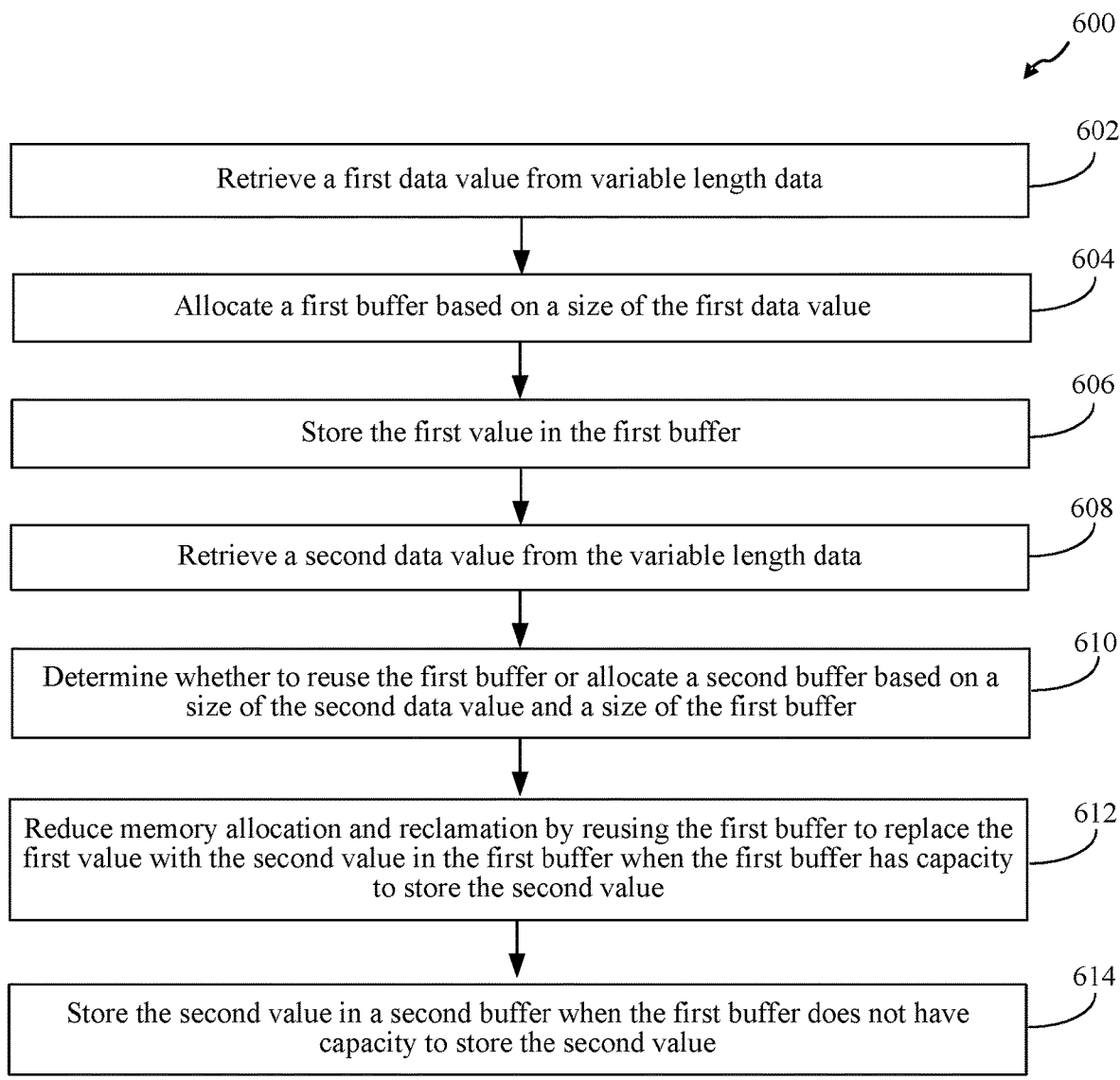
FIG. 6 shows a flowchart of a method for buffer sharing and sparse data handling, according to an example embodiment.

Embodiments may also be implemented in processes or methods. For example, FIG. 6 shows a flowchart of a method for buffer sharing and sparse data handling, according to an example embodiment. Embodiments disclosed herein and other embodiments may operate in accordance with example method 600. Method 600 comprises steps 602-614. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

Method 600 comprises step 602. In step 602, a first data value may be retrieved from variable length data. For example, as shown in FIGS. 2-5, feature column row cursor 505 may be opened on feature dataview DVf. Feature delegate Df in Feature column may be accessed by feature column row cursor 505, which may cause execution of the delegate chain from D1 to Df to compute a value for a row in Feature column, such as row 1 vector 0, 1, 0, 0, 2.

In step 604, a first buffer may be allocated based on a size of the first data value. For example, as shown in FIG. 5, B1 values array and B1 indices array may be allocated for first buffer B1 based on a size of vector value retrieved for row 1 of the Feature column.

In step 606, the first value may be stored in the first buffer. For example, as shown in FIG. 5, first vector in row 1 of Feature column (e.g., 0, 1, 0, 0, 2) may be stored with a sparse vector representation in B1 values array and B1 indices array for first buffer B1.

In step 608, a second data value may be retrieved from variable length data. For example, as shown in FIGS. 2-5, feature column row cursor 505 may access feature delegate Df in Feature column, causing execution of the delegate chain from D1 to Df to compute a value for a row in Feature column, such as row 2 vector 0, 7, 0, 0.

In step 610, a determination may be made whether to reuse the first buffer or allocate a second buffer based on a size of the second data value and a size of the first buffer. For example, as shown in FIG. 5, feature column row cursor 505 may determine whether row 2 vector 0,7, 0, 0 fits in existing B1 values array and B1 indices array to determine whether to reuse B1 values array and B1 indices array or whether to request allocation of a new buffer and/or a new set of (e.g., longer) arrays. In an example, a cursor may seek to downsize or replace an excessively large set of arrays, for example, after a specified number of values are significantly smaller than an existing set of arrays.

In step 612, memory allocation and reclamation may be reduced by reusing the first buffer to replace the first value with the second value in the first buffer when the first buffer has capacity to store the second value. For example, as shown in FIG. 5, feature column row cursor 505 reuses the set of arrays for first buffer B1 to store row 2 vector 0,7,0,0 with a sparse representation.

In step 614, the second value may be stored in a second buffer when the first buffer does not have capacity to store the second value. For example, as shown in FIG. 5, feature column row cursor 505 requests allocation of second buffer B2 and associated set of arrays to store row 3 vector 7, 2, 4, 0, 3, 8, 2, 5 because its length exceeds the length of the set of arrays for first buffer B1.

Figure 7:
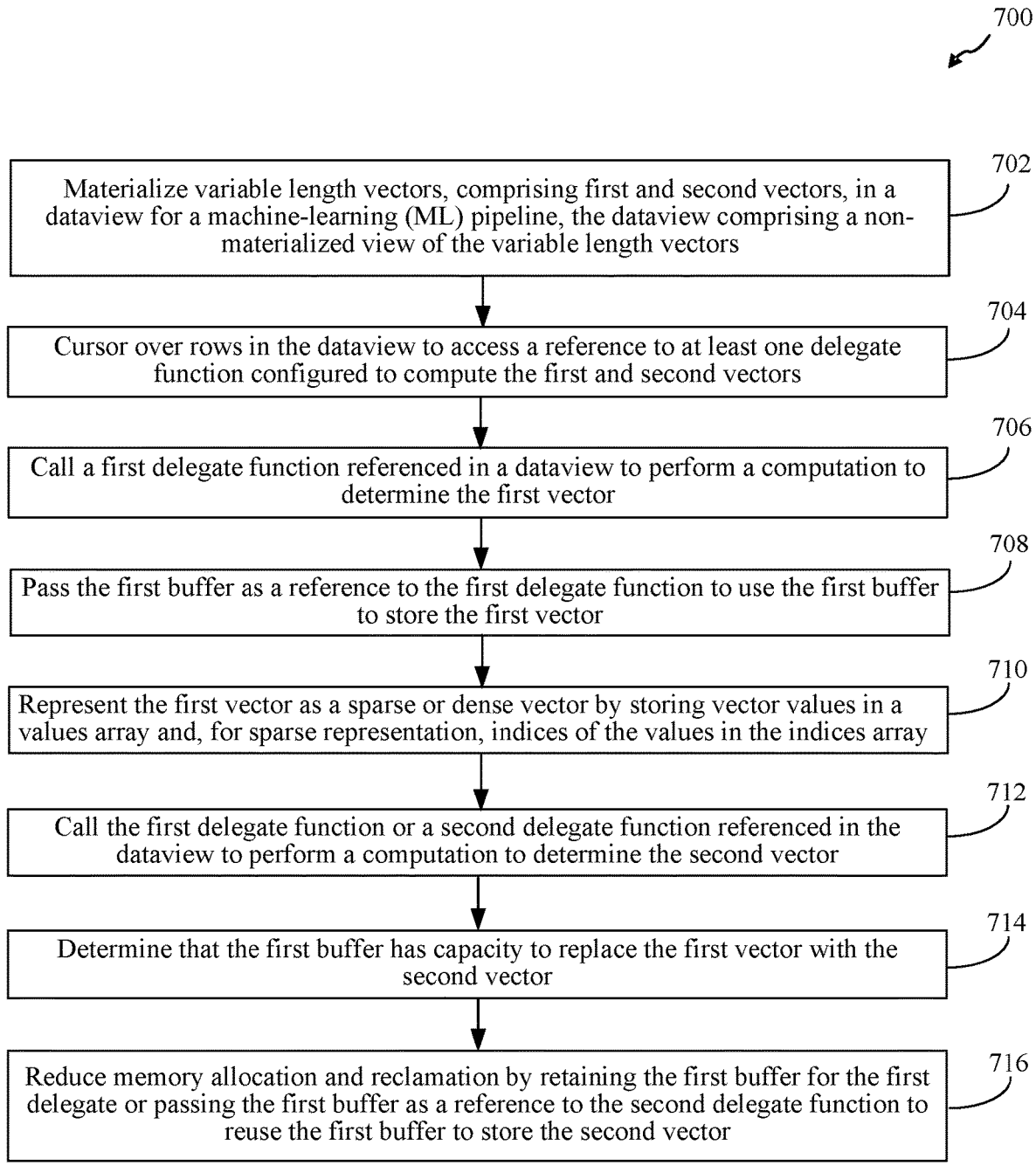
FIG. 7 shows a flowchart of a method for buffer sharing and sparse data handling for an ML pipeline, according to an example embodiment.

FIG. 7 shows a flowchart of a method for buffer sharing and sparse data handling for an ML pipeline, according to an example embodiment. Embodiments disclosed herein and other embodiments may operate in accordance with example method 700. Method 700 comprises steps 702-716. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

Method 700 comprises step 702. In step 702, variable length vectors, comprising first and second vectors, may be materialized in a dataview for a machine-learning (ML) pipeline, the dataview comprising a non-materialized view of the variable length vectors. For example, as shown in FIGS. 1-5, a call may be made (e.g., by application 110) to obtain feature vector values in ML model 115 based on one of training data 231, test data 232 and prediction data 233 provided as input data 234.

In step 704, a cursor may be opened over rows in the dataview to access a reference to at least one delegate function configured to compute the first and second vectors. For example, as shown in FIGS. 2-5, feature column row cursor 505 may be opened on feature dataview DVf to access feature delegate Df in Feature column to compute values for desired rows in Feature column, such as row 1 vector 0, 1, 0, 0, 2 and row 2 vector 0, 7, 0, 0.

In step 706, a call may be made to a first delegate function referenced in a dataview to perform a computation to determine the first vector. For example, as shown in FIGS. 2-5, feature column row cursor 505 opened on feature dataview DVf may call feature delegate Df in Feature column to cause execution of the delegate chain from D1 to Df to compute a vector for a row in Feature column, such as row 1 vector 0, 1, 0, 0, 2.

In step 708, the first buffer may be passed as a reference to the first delegate function to use the first buffer to store the first vector. For example, as shown in FIG. 5, Feature column row cursor 505 may pass first buffer B1 as a reference to feature delegate Df to store row 1 vector 0, 1, 0, 0, 2.

In step 710, the first vector may be represented as a sparse or dense vector by storing vector values in a values array and, for sparse representation, indices of the values in the indices array. For example, as shown in FIG. 5, feature delegate Df may (e.g., at the direction of feature column row cursor 505) store row 1 vector 0, 1, 0, 0, 2 in a sparse vector representation in B1 values array and B1 indices array.

In step 712, the first delegate function or a second delegate function referenced in the dataview may be called to perform a computation to determine the second vector. For example, as shown in FIGS. 2-5, feature column row cursor 505 opened on feature dataview DVf may call feature delegate Df or another feature delegate (e.g., based on the implementation of feature delegates) in Feature column to cause execution of the delegate chain (e.g., from D1 to DF) to compute a vector for a row in Feature column, such as row 2 vector 0, 7, 0, 0.

In step 714, a determination may be made that the first buffer has capacity to replace the first vector with the second vector. For example, as shown in FIG. 5, feature column row cursor 505 may determine that the set of arrays for first buffer B1 are long enough to store the row 2 vector 0, 7, 0, 0.

In step 716, memory allocation and reclamation may be reduced by retaining the first buffer for the first delegate or passing the first buffer as a reference to the second delegate function to reuse the first buffer to store the second vector. For example, as shown in FIGS. 2-5, feature delegate Df may be used to compute row 2 vector 0,7,0,0 and store it with a sparse representation in B1 values array and B1 indices array.

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
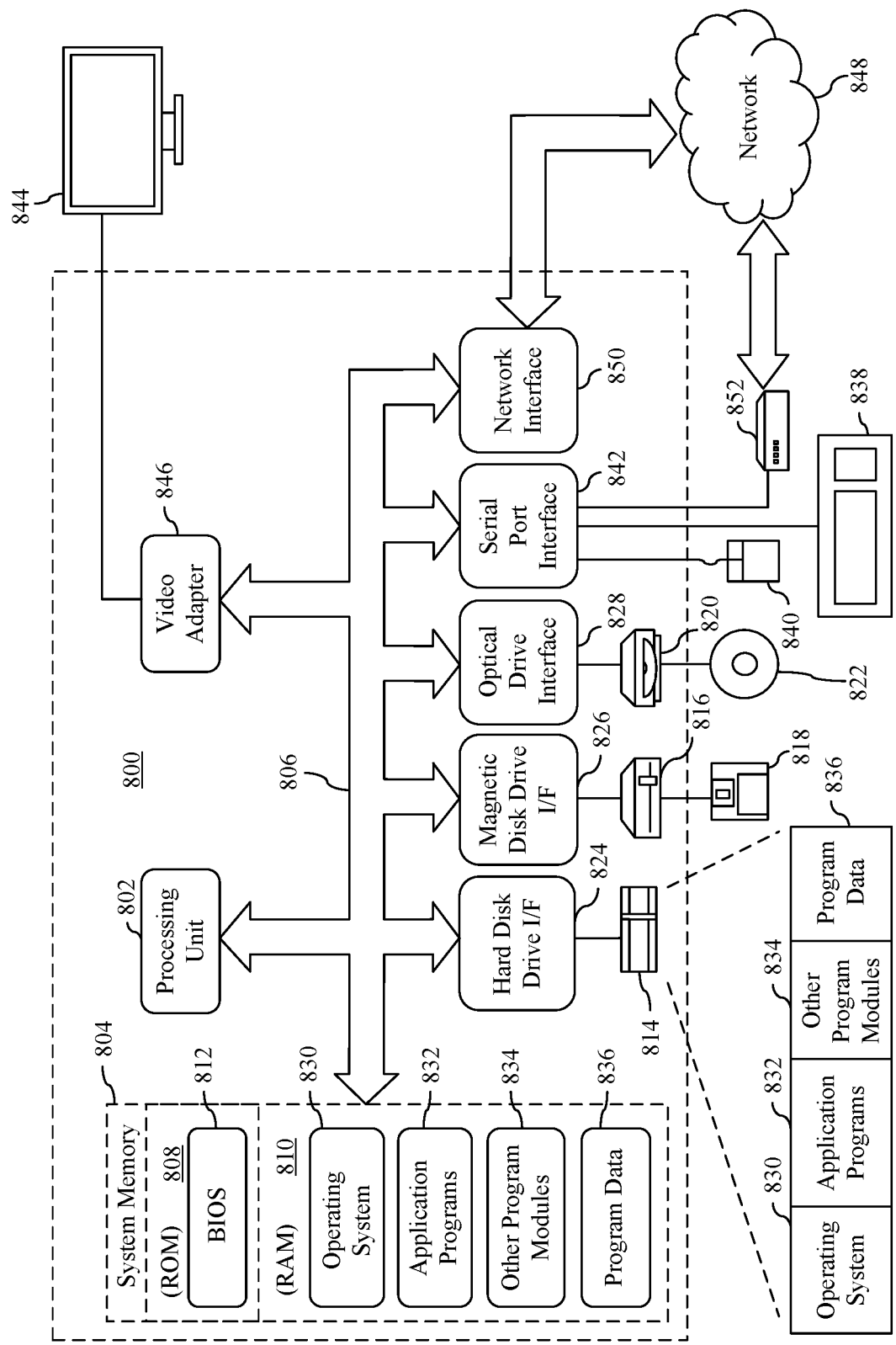
FIG. 8 shows a block diagram of an example computing device that may be used to implement example embodiments.

FIG. 8 shows an exemplary implementation of a computing device 800 in which example embodiments may be implemented. Consistent with all other descriptions provided herein, the description of computing device 800 is a non-limiting example for purposes of illustration. Example embodiments may be implemented in other types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing example embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in, computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media.

Example embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of example embodiments described herein. Accordingly, such computer programs represent controllers of the computing device 800.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems and computer program products are provided for sparse data handling and buffer sharing to reduce memory allocation and reclamation. Data may be buffered in reusable buffer arrays. Data may comprise fixed or variable length vectors, which may be represented as sparse or dense vectors in a values array and indices array. Data may be materialized, for example, from a dataview comprising a non-materialized view of data in a machine-learning (ML) pipeline by cursoring over rows of the dataview and calling delegate functions to compute data for rows in an active column. A buffer and/or its set of arrays storing a first vector may be reused for a second and additional vectors, for example, when the length of buffer arrays is equal to or greater than the length of the second and additional vectors, which may be selectively stored as a sparse or dense vectors to fit in the set of arrays. Shared buffers may be passed as references between delegate functions for reuse.

In an example, a method for sparse data handling and buffer sharing to reduce memory allocation and reclamation may comprise, for example, retrieving a first value from variable length data; storing the first value in a first buffer; retrieving a second value from the variable length data; reducing memory allocation and reclamation by reusing the first buffer to replace the first value with the second value in the first buffer when the first buffer has capacity to store the second value; and storing the second value in a second buffer when the first buffer does not have capacity to store the second value.

In an example, the method may further comprise, for example, retrieving a third value from the variable length data; reusing the second buffer by replacing the second value with the third value in the second buffer when the second buffer is large enough to store the third value; and storing the third value in the third buffer when the second buffer is not large enough to store the third value.

In an example, the first, second and third values may be retrieved from rows in a first column of the variable length data.

In an example, the first buffer may comprise a first set of arrays, the first set of arrays comprising a first array and a second array, the first array comprising a first memory range and the second array comprising a second memory range.

In an example, the method may further comprise, for example, reusing the first set of arrays by reassigning the first set of arrays from the first buffer to a different buffer that stores the second value.

In an example, the first value may comprise a first vector. The method may further comprise, for example, representing the first vector as a sparse vector by: storing a plurality of values in the first vector in the first array; and storing a plurality of indices of the values in the first vector in the second array.

In an example, the second value may comprise a second vector. The method may further comprise, for example, representing the second vector as a dense vector by: storing a plurality of values in the second vector in the first array; and not using the second array.

In an example, the first value and the second value may be retrieved while processing source data in a machine learning (ML) pipeline.

In an example, the first and second values may be retrieved from a dataview in the ML pipeline, the dataview providing a non-materialized view of the data. In an example, retrieving the first value may comprise calling a first delegate function referenced in the dataview to perform a computation to determine the first value. In an example, retrieving a second value may comprise calling the first delegate function or a second delegate function referenced in the dataview to perform a computation to determine the second value.

In an example, the method may further comprise, for example, passing the first buffer as a reference to the first delegate function to use the first buffer to store the first value; determining that the first buffer has capacity to replace the first value with the second value; and retaining the first buffer for the first delegate or passing the first buffer as a reference to a second delegate function to reuse the first buffer to store the second value.

In an example, a computing device may comprise, for example, one or more processors; and one or more memory devices that store program code configured to be executed by the one or more processors. The program code may comprise a memory manager configured to: reduce memory allocation and reclamation by reusing buffers to store variable length data; allocate a first buffer based on a size of a first data; store the first data in the first buffer; determine whether to reuse the first buffer or allocate a second buffer based on a size of a second data and a size of the first buffer; reduce memory allocation and reclamation by reusing the first buffer to store the second data in the first buffer when the size of the first buffer is greater than or equal to the size of the second data; and store the second data in the second buffer when the size of the first buffer is less than the size of the second data.

In an example, the memory manager may be further configured to: determine whether to reuse the second buffer or allocate a third buffer based on a size of a third data and a size of the second buffer; reduce memory allocation and reclamation by reusing the second buffer to store the third data in the second buffer when the size of the second buffer is greater than or equal to the size of the third data; and store the third data in the third buffer when the size of the second buffer is less than the size of the third data.

In an example, the first, second and third data may be variable length vectors retrieved from a first column of a dataview in a machine-learning (ML) pipeline, the dataview comprising a non-materialized view of the first, second and third data; and the first buffer may comprise a first values array and a first indices array having a first length to store the first data as one of a representation of a dense vector and a sparse vector.

In an example, the memory manager further configured to reuse the first values array and the first indices array by reassigning the first values array and the first indices array from the first buffer to a different buffer that stores the second data.

In an example, the program code may further comprise, for example, a cursor configured to access delegates in the dataview to compute the first, second and third data.

In an example, the cursor may be further configured to, for example, pass the first buffer as a reference to a first delegate function to use the first buffer to store the first data; and retain the first buffer for the first delegate function or pass the first buffer as a reference to a second delegate function to reuse the first buffer to store the second data.

In an example, a computer-readable storage medium may have program instructions recorded thereon that, when executed by a processing circuit, perform a method. The method may comprise, for example, materializing variable length vectors, comprising first and second vectors, in a dataview for a machine-learning (ML) pipeline, the dataview comprising a non-materialized view of the variable length vectors; storing the first vector in a first buffer comprising a values array and an indices array.

In an example, the method may further comprise, for example, selecting between (i) storing the first vector in the values array as a dense vector and (ii) storing the first vector in the values array and the indices array as a sparse vector.

In an example, the method may further comprise, for example, reducing memory allocation and reclamation by reusing the first buffer to replace the first vector with the second vector in the first buffer when the first buffer has capacity to store the second vector; and storing the second vector in a second buffer when the first buffer does not have capacity to store the second vector.

In an example, the method may further comprise, for example, cursoring over rows in the dataview to access a reference to at least one delegate function configured to compute the first and second vectors.

Methods, systems and computer program products are provided for an efficient, streaming-based, lazily-evaluated machine learning (ML) framework. An ML pipeline of operators produce and consume a chain of dataviews representing a computation over data. Non-materialized (e.g., virtual) views of data in dataviews permit efficient, lazy evaluation of data on demand regardless of size (e.g., in excess of main memory). Data may be materialized by DataView cursors (e.g., movable windows over rows of an input dataset or DataView). Computation and data movement may be limited to rows for active columns without processing or materializing unnecessary data. A chain of dataviews may comprise a chain of delegates that reference a chain of functions. Assembled pipelines of schematized compositions of operators may be validated and optimized with efficient execution plans. A compiled chain of functions may be optimized and executed in a single call. Dataview based ML pipelines may be developed, trained, evaluated and integrated into applications.

In an example, a method for lazy evaluation of input data by a machine learning (ML) pipeline comprising a chain of dataviews representing a computation over data (e.g., as a non-materialized view of the data), may comprise, for example, receiving a request for data from at least one column in a dataview in the chain of dataviews; selecting a chain of delegates comprising one or more delegates for one or more dataviews in the chain of dataviews, (e.g. a first delegate in a first dataview and a second delegate in a second dataview) to (e.g., perform one or more computations to) fulfill the request; and processing the input data (e.g., by iterating over rows of the one or more dataviews while performing the one or more computations) with the selected chain of delegates to (e.g. produce row values for the at least one column to) fulfill the request.

In an example, the method may further comprise, for example, avoiding processing a portion of the input data or a portion of the pipeline unnecessary to fulfill the request.

In an example, the method may further comprise, for example, opening a first cursor on the first dataview in the chain of dataviews to access or load data represented by the first dataview; and opening, based on a dependency between the first and second dataviews, a second cursor on the second dataview in the chain of delegates to access data represented by the second dataview.

In an example, the method may further comprise, for example, calling a first delegate in the first dataview in the chain of delegates to perform a computation to create data represented by the first dataview; and calling, based on a dependency between the first and second delegates, a second delegate in the second dataview to perform a computation to create data represented by the second dataview.

In an example, the request for data may comprise, for example, a request to provide feature values as training data to train the ML pipeline to predict label values.

In an example, the input data may comprise, for example, training data that exceeds available computer memory. The method may further comprise, for example, streaming the input data to the ML pipeline.

In an example, the method may further comprise, for example, executing the ML pipeline in a managed runtime environment; and making the request by an application.

In an example, a computing device may comprise, for example, one or more processors; and one or more memory devices that store program code configured to be executed by the one or more processors. The program code may comprise, for example, a machine-learning (ML) pipeline [object] comprising a chain of operators compilable into a chain of dataviews configured for lazy evaluation of input data, where a dataview comprises a representation of a computation over data as a non-materialized view of the data.

In an example, the chain of operators may comprise, for example, a loader configurable to create an input dataview from input data; a featurizer configurable to create a feature dataview based on the input dataview; and a predictor configurable to make a prediction based on feature values represented by a chain of delegates in the feature dataview and the input dataview.

In an example, the computing device may further comprise, for example, a trainer configured to train the ML pipeline by fitting the feature values to the ML pipeline. In an example, at least one of the featurizer and the algorithm may be trainable.

In an example, the featurizer may comprise a chain of transformers trained or configured to be trained by a chain of estimators based on training data, wherein each trained transformer (i) operates on one or more columns in one or more dataviews and (ii) creates an output dataview in the chain of dataviews.

In an example, the ML pipeline may be configurable to execute a training task, a testing task and a prediction task.

In an example, the input dataview may comprise a table with columns and row. The feature dataview may comprise the input dataview with at least one additional column comprising at least a feature column with a non-materialized view of feature values.

In an example, the feature column of the feature dataview may comprise, for example, a representation of a value getter function configured to open a cursor on a selected row of the input dataview in the chain of dataviews with an instruction to make at least one column of the input dataview active; and a value getter delegate configured to get materialized values in the at least one active column of the selected row.

In an example, a computer-readable storage medium may have program instructions recorded thereon that, when executed by a processing circuit, perform a method comprising, for example, providing a dataview, where a column of the dataview is a feature column and where a dataview comprises a non-materialized view of data; performing delegate chaining on the dataview to determine a set of input columns and a chain of delegates to determine a feature value in the feature column; determining the feature value for the feature column based on the determined set of input columns and the chain of delegates; and providing the feature value to a machine learning (ML) algorithm to make a prediction based on the feature value.

In an example, performing delegate chaining on the dataview may comprise, for example, determining a first function associated with the feature column; determining any input columns that are an input to the first function; and iteratively determining any next functions associated with the input columns, and any next input columns that are an input to the any next functions.

In an example, determining a feature value may comprise, for example, processing the set of input columns with a chain of functions represented by the chain of delegates, the chain of functions comprising the first function and any next functions.

In an example, the method may further comprise, for example, streaming data from storage that stores an input dataset to an ML pipeline comprising the ML algorithm.

In an example, the set of input columns may comprise, for example, a feature vector column in the dataview.

In an example, each delegate in the chain of delegates may reside in a dataview.

In an example of a method for lazy evaluation of input data by a machine learning (ML) pipeline comprising a chain of dataviews, a dataview may represent a computation over data as a non-materialized view of the data. The method may comprise, for example, receiving a request for data for at least one column in a dataview in the chain of dataviews; constructing or calling a delegate for each requested column; using, by each delegate, zero or more additional delegates from zero or more dataviews in or up the chain of dataviews to produce the data for the at least one column; and iterating over the rows of the dataview while invoking the delegates to produce the data for the at least one column.

In an example, a delegate may be associated with a cursor. A cursor may move from row to row. A delegate may get the value for an active column for the current row of a cursor.

In an example of a method for lazy evaluation of input data by a machine learning (ML) pipeline comprising a chain of dataviews, a dataview may represent a computation over data as a non-materialized view of the data. The method may comprise, for example, receiving a request for data for at least one column in a dataview in the chain of dataviews; identifying a computation to produce data values for the at least one column; and iterating over rows of the dataview, performing the computations to produce the data values for the at least one column In an example, the computation(s) to produce the data values for the at least one column may comprise a delegate.

In an example, the delegate may use zero or more additional delegates (e.g. a chain of delegates) from zero or more dataviews in the chain of dataviews.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
   processing source data in a machine learning (ML) pipeline, including:
      retrieving a first value, from fixed or variable length data in a dataview of the ML pipeline, wherein the dataview provides a non-materialized view of the data and retrieving the first value comprises calling a first delegate function referenced in the dataview to perform a first computation to determine the first value;
   storing the first value in a first set of arrays of a first buffer, the first set of arrays comprising a first array and a second array;
   reassigning the first set of arrays from the first buffer to a second buffer;
   retrieving a second value from the fixed or variable length data, by calling the first delegate function or a second delegate function referenced in the dataview to perform a second computation to determine the second value; and
   storing the second value in the first buffer.

2. The method of claim 1, further comprising:
   retrieving a third value from the fixed or variable length data;
   in response to a determination the second buffer is large enough to store the third value, replacing the first value with the third value in the second buffer.

3. The method of claim 2, comprising:
   wherein the first, second and third values are retrieved from rows in a first column in the fixed or variable length data.

4. The method of claim 1, the first array comprising a first memory range and the second array comprising a second memory range.

5. The method of claim 4, the first value comprising a first vector, further comprising:
   representing the first vector as a sparse vector by:
   storing values in the first vector in the first array; and
   storing indices of the values in the first vector in the second array.

6. The method of claim 1, further comprising:
   passing the first buffer as a reference to the first delegate function to use the first buffer to store the first value;
   determining that the first buffer has capacity to replace the first value with the second value; and retaining the first buffer for the first delegate function or passing the first buffer as a reference to the second delegate function to store the second value in the first buffer.

7. A method comprising:
processing source data in a machine learning (ML) pipeline, including:
retrieving a first value, from fixed or variable length data in a dataview of the ML pipeline, wherein the dataview provides a non-materialized view of the data and retrieving the first value comprises calling a first delegate function referenced in the dataview to perform a first computation to determine the first value, the first value comprising a first vector;
storing the first value in a first set of arrays of a first buffer, the first set of arrays comprising a first array and a second array, the first array comprising a first memory range and the second array comprising a second memory range, said storing the first value, further comprising representing the first vector as a sparse vector by:
storing values in the first vector in the first array, and storing indices of the values in the first vector in the second array;
reassigning the first set of arrays from the first buffer to a second buffer;
retrieving a second value from the fixed or variable length data; and
storing the second value in the first buffer.

8. The method of claim 7, the second value comprising a second vector, further comprising:
representing the second vector as a dense vector by:
storing a plurality of values in the second vector in the first array; and
not using the second array.

9. The method of claim 7, wherein said retrieving the second value comprises calling the first delegate function or a second delegate function referenced in the dataview to perform a second computation to determine the second value.

10. A computing device, comprising:
one or more processors; and
one or more memory devices that store program code configured to be executed by the one or more processors, the program code comprising a memory manager configured to:
retrieve a first and a second variable length vector from a first column of a dataview in a machine-learning (ML) pipeline, wherein the dataview comprises a non-materialized view of the first and second vectors;
allocate a first buffer based on a size of the first vector, the first buffer comprising a values array and a indices array, the indices array having a first length to store the first vector as one of a representation of a dense vector and a sparse vector;
store the first vector in the first buffer;
reassign the values array from the first buffer to a second buffer;
store the second vector in the first buffer;
retrieve a third variable length vector from the first column of the dataview, the dataview comprising a non-materialized view of the third vector; and
in response to a determination of a size of the second buffer is greater than or equal to a size of the third variable length vector, store the third vector in the second buffer.

11. The computing device of claim 10, wherein the program code further comprises:
a cursor configured to access delegates in the dataview to compute the first, second and third vectors.

12. The computing device of claim 11, wherein the cursor is further configured to:
pass the first buffer as a reference to a first delegate function to use the first buffer to store the first vector; and
retain the first buffer for the first delegate function or pass the first buffer as a reference to the second delegate function to store the second vector in the first buffer.

13. A computer-readable storage medium having program instructions recorded thereon that, when executed by a processing circuit, perform a method comprising:
materializing fixed or variable length vectors, comprising first and second vectors, in a dataview for a machine-learning (ML) pipeline by cursoring over rows in the dataview to access a reference to at least one delegate function configured to compute the first and second vectors, the dataview comprising a non-materialized view of the fixed or variable length vectors;
storing the first vector in a first buffer comprising a values array and an indices array;
in response to a determination the first buffer has capacity to store the second vector,
reducing memory allocation and reclamation by reusing the first buffer to replace the first vector with the second vector in the first buffer;
in response to a determination the first buffer does not have capacity to store the second vector,
storing the second vector in a second buffer; and
reusing the first buffer by reassigning the values array from the first buffer to the second buffer.

14. The computer-readable storage medium of claim 13, the method further comprising:
selecting between (i) storing the first vector in the values array as a dense vector and (ii) storing the first vector in the values array and the indices array as a sparse vector.

15. The computer-readable storage medium of claim 14, wherein storing the first vector in the values array and the indices array as a sparse vector comprises:
storing values in the first vector in the values array; and
storing indices of the values in the first vector in the indices array.

16. The computer-readable storage medium of claim 14, wherein storing the first vector in the values array as a dense vector comprises:
storing a plurality of values in the second vector in the values array; and not using the second array.

17. The computer-readable storage medium of claim 13, the method further comprising:
determining whether to reuse the second buffer or allocate a third buffer based on a size of a third vector and a size of the second buffer; and
in response to a determination the size of the second buffer is greater than or equal to the size of the third vector, reducing memory allocation and reclamation by reusing the second buffer to store the third vector in the second buffer.

18. The computer-readable storage medium of claim 17, the method further comprising:
in response to a determination the size of the second buffer is less than the size of the third vector, storing the third vector in the third buffer.

19. A method comprising:
processing source data in a machine learning (ML) pipeline, including:
retrieving a first value, from fixed or variable length data in a dataview of the ML pipeline, wherein the dataview provides a non-materialized view of the data and retrieving the first value comprises calling a first delegate function referenced in the dataview to perform a first computation to determine the first value;
storing the first value in a first set of arrays of a first buffer, the first set of arrays comprising a first array and a second array;
reassigning the first set of arrays from the first buffer to a second buffer;
retrieving a second value from the fixed or variable length data;
storing the second value in the first buffer;
determining whether to store a third vector in the second buffer or allocate a third buffer based on a size of the third vector and a size of the second buffer;
in response to a determination the size of the second buffer is less than the size of the third vector, storing the third vector in the third buffer; and
in response to a determination the size of the second buffer is greater than or equal to the size of the third vector, storing the third vector in the second buffer.

20. The method of claim 19, wherein said retrieving the second value comprises calling the first delegate function or a second delegate function referenced in the dataview to perform a second computation to determine the second value.

* * * * *